US012232662B2

(12) United States Patent
van Dongen et al.

(10) Patent No.: US 12,232,662 B2
(45) Date of Patent: Feb. 25, 2025

(54) LIFT ASSIST SHOWER CHAIR

(71) Applicant: DWP Industries LLC, Spring, TX (US)

(72) Inventors: Peter Guy van Dongen, Spring, TX (US); Johannes DeWet Zwarts, Wellington (NZ)

(73) Assignee: DWP Industries LLC, Spring, TX (US)

( * ) Notice: Subject to any disclaimer, the term of this patent is extended or adjusted under 35 U.S.C. 154(b) by 448 days.

(21) Appl. No.: 17/831,320

(22) Filed: Jun. 2, 2022

(65) Prior Publication Data

US 2023/0172400 A1 Jun. 8, 2023

Related U.S. Application Data

(60) Provisional application No. 63/287,441, filed on Dec. 8, 2021, provisional application No. 63/287,453, filed on Dec. 8, 2021.

(51) Int. Cl.
*A47K 3/12* (2006.01)
*A47C 3/18* (2006.01)
(Continued)

(52) U.S. Cl.
CPC ................ *A47K 3/122* (2013.01); *A47C 3/18* (2013.01); *A47C 3/30* (2013.01); *A47K 3/282* (2013.01);
(Continued)

(58) Field of Classification Search
None
See application file for complete search history.

(56) References Cited

U.S. PATENT DOCUMENTS 5,346,280 A * 9/1994 Deumite .................. A61G 5/14
297/DIG. 10
5,882,076 A * 3/1999 Garelick .............. A47C 15/004
297/344.22
(Continued)

FOREIGN PATENT DOCUMENTS

EP 2762121 A1 * 8/2014 ............... A61G 5/06
IT 2016 0011 7851 A1 5/2018
(Continued)

OTHER PUBLICATIONS

European Search Report dated 03.05.2023 for Application No. 22231839.0-1113.

*Primary Examiner* — David E Allred
(74) *Attorney, Agent, or Firm* — Quisenberry Law PLLC

(57) ABSTRACT

A waterproof chair for use when bathing is provided. The chair may include an on-board system for raising and lowering the chair between sitting and raised positions. The chair may be used by elderly persons to assist them in sitting and standing in a shower, for example. The chair may include a rechargeable battery for powering a linear actuator for moving the chair between sitting and raised positions. The chair may also be adapted to allow a seat on the chair to swivel relative to a base of the chair. The chair may include an automatic lock to restrict relative movement of the seat and the base when the seat is being raised, and then automatically unlock to again allow for swivel motion when the seat has been moved back into its sitting position. Hydraulic and pneumatic embodiments are also disclosed.

48 Claims, 20 Drawing Sheets

(51) Int. Cl.
*A47C 3/30* (2006.01)
*A47K 3/28* (2006.01)
*A61G 5/10* (2006.01)
*A61G 5/14* (2006.01)

(52) U.S. Cl.
CPC ......... *A61G 5/1059* (2013.01); *A61G 5/1072* (2013.01); *A61G 5/14* (2013.01)

(56) References Cited

U.S. PATENT DOCUMENTS 6,154,690 A * 11/2000 Coleman .................. A61G 5/14
701/34.2
6,196,630 B1 * 3/2001 Cheng ...................... A47C 3/18
297/344.22
6,553,585 B1 * 4/2003 Lundstrom .......... A61G 7/1007
4/667
6,877,811 B1 * 4/2005 Garelick .................. A47C 3/18
297/344.22
7,108,325 B2 * 9/2006 Williamson ............. B60N 2/08
297/344.22
8,990,975 B1 * 3/2015 Harden .................... A61G 5/10
5/81.1 RP
2003/0062753 A1 * 4/2003 Chao ........................ A61G 5/10
297/344.22
2009/0039692 A1 * 2/2009 Tuckey .................. A47D 1/004
297/344.22
2010/0005591 A1 * 1/2010 Manouchehri ......... A61G 7/053
5/618
2014/0167471 A1 * 6/2014 Haller .................... B60N 2/508
297/344.22
2015/0366351 A1 * 12/2015 Besler ...................... A61G 5/14
297/344.21
2019/0208909 A1 * 7/2019 Fischer ................ A47C 1/0355
2022/0008267 A1 * 1/2022 Nomura ............... A61G 7/1086
2022/0409469 A1 * 12/2022 Shen .................. A63B 21/0058

FOREIGN PATENT DOCUMENTS

IT 2016 011 7851 A1 5/2018
WO WO 2021/224777 A1 11/2021

* cited by examiner

LIFT ASSIST SHOWER CHAIR

RELATED APPLICATIONS

This application claims the benefit of U.S. Provisional Application No. 63/287,441, filed Dec. 8, 2021, and U.S. Provisional Application No. 63/287,453, filed Dec. 8, 2021, the contents of which provisional applications are fully incorporated herein by reference.

BACKGROUND OF THE INVENTIONS

1. Field of the Inventions

The present inventions generally pertain to chairs, and more particularly to chairs for use in a shower to assist people, such as the elderly or injured, who are unstable and experience difficulty sitting down or standing up from a seated position.

2. Description Of The Related Art

It is known that there is risk of injuries due to falls. Statistics show that across all ages, the most hazardous activities in the home are showering, bathing, or getting out of the shower or tub. Approximately two thirds of all injuries occur in the tub or shower, and approximately half are precipitated by showering or bathing, slipping, or getting out of the tub or shower. Centers for Disease Control and Prevention found that approximately 234,000 people ages 15 and older were treated in an American emergency department for non-fatal bathroom-related injuries in 2008. That averages to about 640 people per day. More than 80 percent of bathroom-related injuries are caused by slips and falls, mostly while getting in and out of the shower or tub, and about 30 percent of those injuries included broken bones, cuts, scrapes and bruises. Injury rates were more common in women and older patients. Younger people were more likely to be hurt in or around the shower or tub, while older people sustained more injuries on or near the toilet. Women fall more often than men and account for three-quarters of all hip fractures. Each year at least 300,000 older people are hospitalized for hip fractures. Sixty-eight percent of bathroom injuries were at the shower or tub, while 22.5% were at the toilet. About 36 million older adults fall each year—resulting in more than 32,000 deaths. Each year, about 3 million older adults are treated in emergency departments for a fall injury. One out of every five falls causes an injury, such as broken bones or a head injury. More than 95% of hip fractures are caused by falling (https://pubmed.ncbi.nlm.nih.gov/10441647/)—usually by falling sideways.

It is also known that many injuries occur to healthcare workers. In addition to the above problems experienced by the general public, health care workers have a major need for solutions to aid them with the heavy lifting and lowering associated with patient care. OSHA data shows that sprains and strains are the most frequently reported injury among healthcare workers. Most strains and sprains affect the shoulders and the lower back. Heavy lifting is the most significant risk factor for the development of musculoskeletal injuries, particularly in the lower back, in nurses. Amongst the most common accidents and injuries that occur in healthcare are back injuries. Due to the demanding physical nature of most healthcare jobs, back injuries are estimated to total $7 billion per year. These injuries are most often caused by overexertion and repetitive stress. According to the National Institute for Occupational Safety and Health (NIOSH), occupational back injury is the second leading occupational injury in the United States. Among health care workers, nurses have the highest rate of back pain, with an annual prevalence of 40-50% and a lifetime prevalence of 35-80%. The average back injury case costs $25,000. More serious cases requiring surgery can cost $85,000 (State Compensation Insurance Fund). Based on the average cost stated above, nationally, approximately 67,000 back injuries among health care workers could total $1.7 billion in workers' compensation. Back injury may be the single largest contributor to the nursing shortage.

Current products on the market include shower stools. Currently there are also various lift assist chairs available, however most are lounge chairs or recliner chairs, and none have waterproof components with corrosion resistant materials suitable for a shower application. None are configured to fit into the tight space of a typical shower. Existing lift assist chairs are typically powered by electric cord connected to mains power.

As for shower stools, there are many shower stools available, however they are a static seat (with horizontal movement) only and do not provide the lift/vertical assist and tilt function. These shower stools typically have some height adjustment, achieved with pins/pegs in discrete holes in each individual leg. Requiring adjustment to be done one leg at a time and cannot be done while the person is sitting on the chair. There are also products that assist someone transfer over the edge of a bathtub and raise and lower the user into and out of a bathtub; however, these products do not work for a walk in shower application. Most shower stools do not offer the swivel feature thus water comes from one direction only.

As will become apparent from the description and explanation set forth below, the present inventions overcome the above-described problems by providing improved shower lift chairs and related methods.

SUMMARY OF THE INVENTIONS

In one aspect, the present inventions may include a shower chair designed for a person who is unstable when standing or seated and has difficulty standing up or sitting down from either position. The inventions may include a chair that has many features that enables the user to shower in dignity and safety thus extending their independence and limiting the need for assistance. In one aspect, the inventions are unique because they incorporate certain of the features described below as a combination, and uniquely solve the needs identified above for shower applications. The inventions are designed for someone who is unstable when standing or sitting in the shower, and/or has difficulty standing up or sitting from either position. Typically, these people may be elderly or individuals experiencing weakness due to a physical health condition or injury. Assistance to stand is often more necessary if the individual has been sitting for some time as experienced when taking a shower.

The present inventions seek to provide a solution to the above problems by providing a safe seated position while showering, and then providing assistance to both sit down and to stand up, thus reducing the risk of falling in all three of these activities and thus prolonging their independence. The swivel feature allows the user to orient the seat in any direction they wish, thus enjoying shower water from any direction and preventing the annoyance of water coming from one direction only; it also enables them to turn to the entrance and exit position of the shower door. The inventions can be used in homes, hospitals and assisted living facilities to assist individuals in performing their regular ablutions. The inventions can be used in the healthcare field to prevent disabling back injuries in nurses by assisting them to lift or lower their patient into the standing or seated position when taking a shower.

The inventions may include various features. The inventions may include a lift assist feature that raises and lowers a seat in a controlled manner, which reduces the strength and energy required, pain and discomfort experienced to stand up and ensures a controlled sit-down or standing motion. The inventions may include a tilting function, gently tilting the user out of the chair into the upright standing position. The inventions may include a swivel feature that allows the user to swivel and have shower water spray from any direction. The inventions may include a chair not a stool, with forward reaching arm rests to provide secure, stabilizing hand holds when operating the chair. The inventions may include a seat frame having a rear support for safety and some stability in the rearward direction. The inventions may include a swivel function that may lock when an assist height feature of a seat starts raising to ensure arm rests remain stable hand holds for stability and safety. When an assist height feature is retracted the height from the floor to a seat cushion surface may be adjusted for user comfort and may be operated while the person is seated. A seat frame may be shaped to have a recess in front, rear or completely open to allow convenient access for cleaning between the legs and in the user's crotch area. The seat frame may have handles that bow outwardly to allow wider spreading of the legs for ease of access to wash. With a normal chair you have to let go of the handles as you rise due to arm rest not moving and height restrictions The design of the handles in this invention is such that it provides the ability to remain holding onto the arm rests during the entire process of standing or sitting thus providing support during the entire process. The components of the present inventions are preferably waterproof and made from corrosion resistant materials. The inventions may be made from materials that are anti-microbial, hygienic, easy to clean and suitable for wet locations.

The present inventions in a preferred configuration may be battery powered, thus removing the need for electrical cords and connections to maintain power inside a wet shower. In other configurations the inventions may be powered by water, hydraulic, air or gas systems. The inventions in a preferred configuration may include self-leveling feet suitable for uneven shower floors. An alternative configuration may be to include locking casters to allow the chair to roll into and out of a shower. The inventions may include a seat having safety straps that can be fastened around the waist of the user thus securing them to the seat and preventing the user from accidentally slipping out of the seat when it is raising or lowering.

In one aspect, the present inventions may include a chair comprising: a corrosion-resistant chair base including a plurality of corrosion-resistant legs and a corrosion-resistant central support column; a corrosion-resistant swivel base connected to and supported by the central support column on the chair base, and adapted for rotatable movement relative to the central support column on the chair base; a corrosion-resistant seat frame having a left side, a right side, and an upper surface, the seat frame being connected to the swivel base; a corrosion-resistant seat attached to the upper surface of the seat frame; a corrosion-resistant left arm rest attached to the left side of the seat frame; a corrosion-resistant right arm rest attached to the right side of the seat frame; a corrosion-resistant linear actuator supported by the swivel base and connected to the seat frame to move the seat frame between a sitting position and a raised position; and a waterproof control switch adapted to control the linear actuator. Another feature of this aspect of the present inventions may be that the chair may further include a removable waterproof rechargeable battery, and the linear actuator may be one of an electric linear actuator, a hydraulic linear actuator, and a pneumatic linear actuator, and the removable waterproof rechargeable battery may be in waterproof electrical communication with the linear actuator. Another feature of this aspect of the present inventions may be that the central support column extends upwardly away from a central portion of the chair base, and includes a swivel lock spline. Another feature of this aspect of the present inventions may be that the swivel lock may include a height adjustment lever adapted to actuate a gas spring attached to the central support column to raise and lower the swivel base in relation to the chair base. Another feature of this aspect of the present inventions may be that the swivel base automatically locks to the chair base when the seat frame is raised away from its sitting position to its raised position, and the swivel base automatically unlocks from the chair base when the seat frame is returned to its sitting position. Another feature of this aspect of the present inventions may be that the waterproof control switch is mounted to one of the left arm rest or the right arm rest adjacent a grasping location by a user so that a user can grasp the arm rest to which the waterproof control switch is mounted and operate the waterproof control switch without releasing the user's grasp of said arm rest. Another feature of this aspect of the present inventions may be that each of the chair base, the central support column, the swivel base and the seat frame is constructed from one of aluminum, stainless steel, a powder-coated ferrous metal, carbon fiber, plastic, fiberglass, and polymers. Another feature of this aspect of the present inventions may be that the seat frame includes a recessed opening at a front central location of the seat frame, and the seat includes a corresponding recessed opening. Another feature of this aspect of the present inventions may be that the left arm rest includes a left outwardly curved arcuate support member connected to and extending upwardly and outwardly away from the left side of the seat frame, and the right arm rest includes a right outwardly curved arcuate support member connected to and extending upwardly and outwardly away from the right side of the seat frame. Another feature of this aspect of the present inventions may be that the chair may further include a back support supported by the seat frame and adjacent a rear portion of the seat frame. Another feature of this aspect of the present inventions may be that the chair may further include an upper leg assembly including a left arm, a right arm, and transverse support member disposed between and connected to the left arm and the right arm, a first end of the left arm being connected to a first front left side of the seat frame, a first end of the right arm being connected to a first front right side of the seat frame, a second end of the left arm being connected to a first rear left side of the swivel base, and a second end of the right arm being connected a first rear right side of the swivel base; and a lower leg assembly including a left arm, a right arm, and transverse support member disposed between and connected to the left arm and the right arm, a first end of the left arm being connected to a second front left side of the seat frame, a first end of the right arm being connected to a second front right side of the seat frame, a second end of the left arm being connected to a second rear left side of the swivel base, and a second end of the right arm being connected a second rear right side of the base, wherein a first end of the linear actuator is connected to the transverse support member of the lower leg assembly, and a second end of the linear actuator is connected to the transverse support member of the upper leg assembly. Another feature of this aspect of the present inventions may be that each of the plurality of legs on the chair base includes one of a self-leveling foot member or locking casters. Another feature of this aspect of the present inventions may be that the chair may further include a knee stop connected to one of the seat frame or the swivel base. Another feature of this aspect of the present inventions may be that the chair may further include a left knee stop assembly including a mounting tube attached to a left side of the swivel base, an adjustable frame having a first end adapted for releasable and telescoping movement within the mounting tube, and a flip up stop bar rotatably attached to a second end of the adjustable frame and movable between a first position and a second position; and a right knee stop assembly including a mounting tube attached to a right side of the swivel base, an adjustable frame having a first end adapted for releasable and telescoping movement within the mounting tube, and a flip up stop bar rotatably attached to a second end of the adjustable frame and movable between a first position and a second position. Another feature of this aspect of the present inventions may be that the chair may further include a seat cushion attached to an upper surface of the seat, wherein an upper surface of the seat cushion includes a non-slip texture. Another feature of this aspect of the present inventions may be that the chair may further include a waist belt comprising a first safety strap and a second safety strap, the first safety strap being attached to the left side of the seat frame and the second safety strap being attached to the right side of the seat frame, the first and second safety straps being releaseably engageable to each other. Another feature of this aspect of the present inventions may be that the entirety of the chair is contained within a circle having a center coaxial with a center of the central support column and having a diameter less than 36 inches.

In another aspect, the present inventions may include a chair comprising: a corrosion-resistant chair base including a plurality of corrosion-resistant legs and a corrosion-resistant central support column; a corrosion-resistant swivel base connected to and supported by the central support column on the chair base, and adapted for rotatable movement relative to the central support column on the chair base; a corrosion-resistant seat frame having a left side, a right side, and an upper surface, the seat frame being connected to the swivel base; a corrosion-resistant seat attached to the upper surface of the seat frame; a corrosion-resistant left arm rest attached to the left side of the seat frame; a corrosion-resistant right arm rest attached to the right side of the seat frame; a corrosion-resistant linear actuator supported by the swivel base and connected to the seat frame to move the seat frame between a sitting position and a raised position; a waterproof control switch adapted to control the linear actuator; and a removable waterproof rechargeable battery in waterproof electrical communication with the linear actuator. Another feature of this aspect of the present inventions may be that the central support column extends upwardly away from a central portion of the chair base, and includes a swivel lock spline. Another feature of this aspect of the present inventions may be that the swivel base includes a height adjustment lever adapted to actuate a gas spring attached to the central support column to raise and lower the swivel base in relation to the chair base. Another feature of this aspect of the present inventions may be that the swivel base automatically locks to the chair base when the seat frame is raised away from its sitting position to its raised position, and the swivel base automatically unlocks from the chair base when the seat frame is returned to its sitting position. Another feature of this aspect of the present inventions may be that the waterproof control switch is mounted to one of the left arm rest or the right arm rest adjacent a grasping location by a user so that a user can grasp the arm rest to which the waterproof control switch is mounted and operate the waterproof control switch without releasing the user's grasp of said arm rest. Another feature of this aspect of the present inventions may be that each of the chair base, the central support column, the swivel base and the seat frame is constructed from one of aluminum, stainless steel, a powder-coated ferrous metal, carbon fiber, plastic, fiberglass, and polymers. Another feature of this aspect of the present inventions may be that the seat frame includes a recessed opening at a front central location of the seat frame, and the seat includes a corresponding recessed opening. Another feature of this aspect of the present inventions may be that the left arm rest includes a left outwardly curved arcuate support member connected to and extending upwardly and outwardly away from the left side of the seat frame, and the right arm rest includes a right outwardly curved arcuate support member connected to and extending upwardly and outwardly away from the right side of the seat frame. Another feature of this aspect of the present inventions may be that the chair may further include a back support supported by the seat frame and adjacent a rear portion of the seat frame. Another feature of this aspect of the present inventions may be that the chair may further include an upper leg assembly including a left arm, a right arm, and transverse support member disposed between and connected to the left arm and the right arm, a first end of the left arm being connected to a first front left side of the seat frame, a first end of the right arm being connected to a first front right side of the seat frame, a second end of the left arm being connected to a first rear left side of the swivel base, and a second end of the right arm being connected a first rear right side of the swivel base; and a lower leg assembly including a left arm, a right arm, and transverse support member disposed between and connected to the left arm and the right arm, a first end of the left arm being connected to a second front left side of the seat frame, a first end of the right arm being connected to a second front right side of the seat frame, a second end of the left arm being connected to a second rear left side of the swivel base, and a second end of the right arm being connected a second rear right side of the base, wherein a first end of the linear actuator is connected to the transverse support member of the lower leg assembly, and a second end of the linear actuator is connected to the transverse support member of the upper leg assembly. Another feature of this aspect of the present inventions may be that each of the plurality of legs on the chair base includes one of a self-leveling foot member or locking casters. Another feature of this aspect of the present inventions may be that the chair may further include a knee stop connected to one of the seat frame or the swivel base. Another feature of this aspect of the present inventions may be that the chair may further include a left knee stop assembly including a mounting tube attached to a left side of the swivel base, an adjustable frame having a first end adapted for releasable and telescoping movement within the mounting tube, and a flip up stop bar rotatably attached to a second end of the adjustable frame and movable between a first position and a second position; and a right knee stop assembly including a mounting tube attached to a right side of the swivel base, an adjustable frame having a first end adapted for releasable and telescoping movement within the mounting tube, and a flip up stop bar rotatably attached to a second end of the adjustable frame and movable between a first position and a second position. Another feature of this aspect of the present inventions may be that the chair may further include a seat cushion attached to an upper surface of the seat, wherein an upper surface of the seat cushion includes a non-slip texture. Another feature of this aspect of the present inventions may be that the chair may further include a waist belt comprising a first safety strap and a second safety strap, the first safety strap being attached to the left side of the seat frame and the second safety strap being attached to the right side of the seat frame, the first and second safety straps being releaseably engageable to each other. Another feature of this aspect of the present inventions may be that the entirety of the chair is contained within a circle having a center coaxial with a center of the central support column and having a diameter less than 36 inches.

In still another aspect, the present inventions may include a chair comprising: a corrosion-resistant chair base including a plurality of corrosion-resistant legs and a corrosion-resistant central support column; a spline secured around the central support column and including a plurality of longitudinal grooves disposed in an outer surface of the spline; a corrosion-resistant swivel base connected to and supported by the central support column on the chair base, and adapted for rotatable movement relative to the central support column on the chair base; a corrosion-resistant seat frame having a left side, a right side, and an upper surface, the seat frame being connected to the swivel base; a corrosion-resistant seat attached to the upper surface of the seat frame; a corrosion-resistant left arm rest attached to the left side of the seat frame; a corrosion-resistant right arm rest attached to the right side of the seat frame; a corrosion-resistant linear actuator supported by the swivel base and connected to the seat frame to move the seat frame between a sitting position and a raised position; a waterproof control switch adapted to control the linear actuator; a removable waterproof rechargeable battery in waterproof electrical communication with the linear actuator; and a drive pin connected to the swivel base and disposed for movement between an extended position and a retracted position, and a latch plate disposed for movement between an extended position and a retracted position, the latch plate engaging one of the plurality of longitudinal grooves in the spline when the drive pin is in its extended position, and the latch plate being disengaged from the spline when the drive pin is in its retracted position. Another feature of this aspect of the present inventions may be that the central support column extends upwardly away from a central portion of the chair base, and includes a swivel lock spline. Another feature of this aspect of the present inventions may be that the swivel base includes a height adjustment lever adapted to actuate a gas spring attached to the central support column to raise and lower the swivel base in relation to the chair base. Another feature of this aspect of the present inventions may be that the waterproof control switch is mounted to one of the left arm rest or the right arm rest adjacent a grasping location by a user so that a user can grasp the arm rest to which the waterproof control switch is mounted and operate the waterproof control switch without releasing the user's grasp of said arm rest. Another feature of this aspect of the present inventions may be that each of the chair base, the central support column, the swivel base and the seat frame is constructed from one of aluminum, stainless steel, a powder-coated ferrous metal, carbon fiber, plastic, fiberglass, and polymers. Another feature of this aspect of the present inventions may be that the seat frame includes a recessed opening at a front central location of the seat frame, and the seat includes a corresponding recessed opening. Another feature of this aspect of the present inventions may be that the left arm rest includes a left outwardly curved arcuate support member connected to and extending upwardly and outwardly away from the left side of the seat frame, and the right arm rest includes a right outwardly curved arcuate support member connected to and extending upwardly and outwardly away from the right side of the seat frame. Another feature of this aspect of the present inventions may be that the chair may further include a back support supported by the seat frame and adjacent a rear portion of the seat frame. Another feature of this aspect of the present inventions may be that the chair may further include an upper leg assembly including a left arm, a right arm, and transverse support member disposed between and connected to the left arm and the right arm, a first end of the left arm being connected to a first front left side of the seat frame, a first end of the right arm being connected to a first front right side of the seat frame, a second end of the left arm being connected to a first rear left side of the swivel base, and a second end of the right arm being connected a first rear right side of the swivel base; and a lower leg assembly including a left arm, a right arm, and transverse support member disposed between and connected to the left arm and the right arm, a first end of the left arm being connected to a second front left side of the seat frame, a first end of the right arm being connected to a second front right side of the seat frame, a second end of the left arm being connected to a second rear left side of the swivel base, and a second end of the right arm being connected a second rear right side of the base, wherein a first end of the linear actuator is connected to the transverse support member of the lower leg assembly, and a second end of the linear actuator is connected to the transverse support member of the upper leg assembly. Another feature of this aspect of the present inventions may be that each of the plurality of legs on the chair base includes one of a self-leveling foot member or locking casters. Another feature of this aspect of the present inventions may be that the chair may further include a knee stop connected to one of the seat frame or the swivel base. Another feature of this aspect of the present inventions may be that the chair may further include a left knee stop assembly including a mounting tube attached to a left side of the swivel base, an adjustable frame having a first end adapted for releasable and telescoping movement within the mounting tube, and a flip up stop bar rotatably attached to a second end of the adjustable frame and movable between a first position and a second position; and a right knee stop assembly including a mounting tube attached to a right side of the swivel base, an adjustable frame having a first end adapted for releasable and telescoping movement within the mounting tube, and a flip up stop bar rotatably attached to a second end of the adjustable frame and movable between a first position and a second position. Another feature of this aspect of the present inventions may be that the chair may further include a seat cushion attached to an upper surface of the seat, wherein an upper surface of the seat cushion includes a non-slip texture. Another feature of this aspect of the present inventions may be that the chair may further include a waist belt comprising a first safety strap and a second safety strap, the first safety strap being attached to the left side of the seat frame and the second safety strap being attached to the right side of the seat frame, the first and second safety straps being releaseably engageable to each other. Another feature of this aspect of the present inventions may be that the entirety of the chair is contained within a circle having a center coaxial with a center of the central support column and having a diameter less than 36 inches.

Other features, aspects and advantages of the present inventions will become apparent from the following discussion and detailed description.

Figure 1:
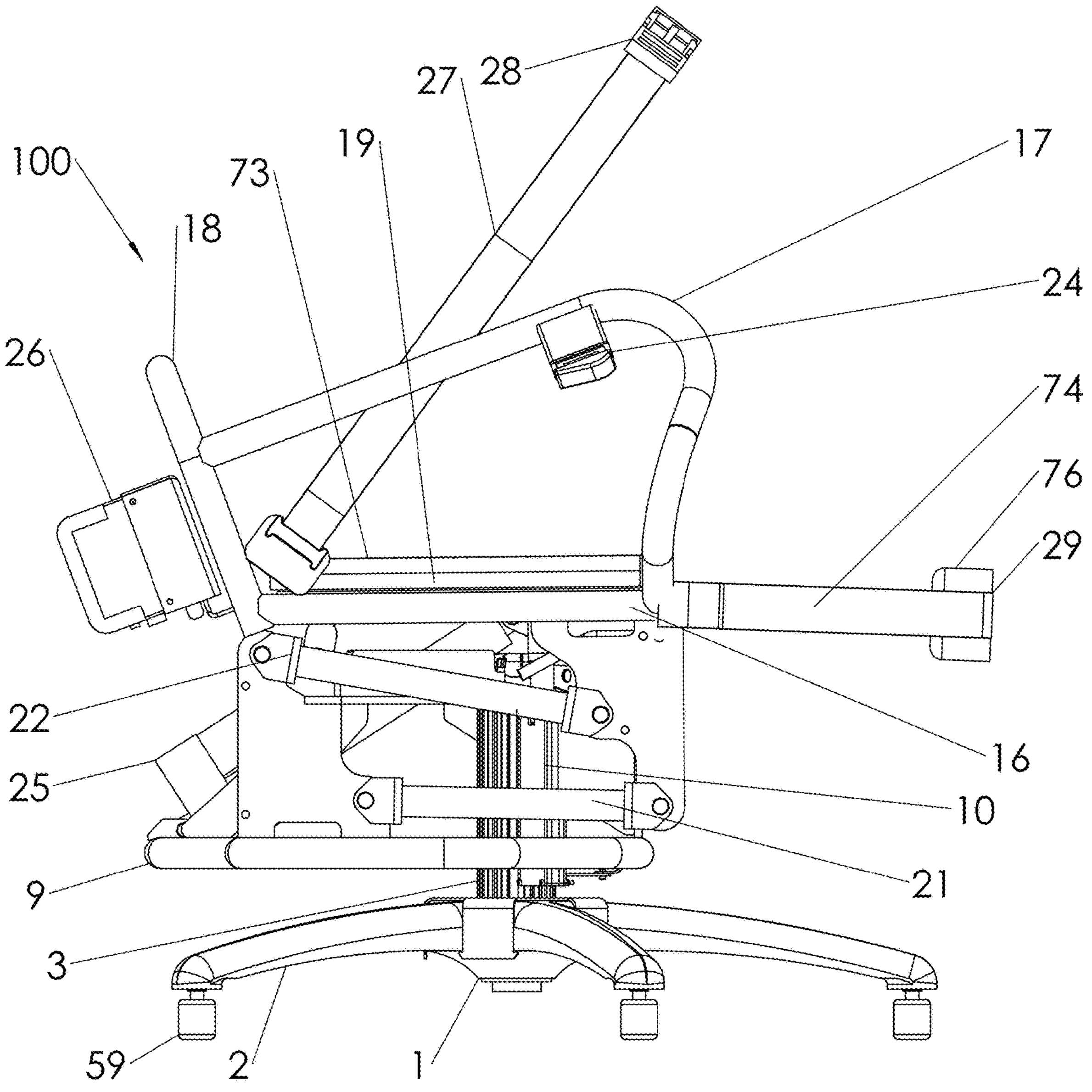
FIG. 1 is a side view of a shower chair constructed in accordance with a specific embodiment of the present inventions, and illustrates the seat assist height in a lowered or sitting position and the chair frame height in a lowered or bottom position.

While the inventions will be described in connection with the preferred embodiments, it will be understood that the scope of protection is not intended to limit the inventions to those embodiments. On the contrary, the scope of protection is intended to cover all alternatives, modifications, and equivalents as may be included within the spirit and scope of the inventions as defined by the appended claims.

DETAILED DESCRIPTION OF THE INVENTION

Referring to the drawings in detail, wherein like numerals denote identical elements throughout the several views, and referring initially to FIGS. 1-4, there is shown a side view of a specific embodiment of a lift assist shower chair 100 including a chair base 1, a swivel base 9, and a seat frame 16. The chair base 1 may include a central support column 3 extending upwardly in a generally vertical orientation away from a central portion of the chair base 1. The central support column may include a gas spring 4 and a swivel lock spline 5. In a specific embodiment, the gas spring 4 may comprise a corrosion-resistant gas cylinder. This component, and the other components and fittings from which the present inventions are constructed, may be made from various corrosion-resistant materials, such as aluminum, stainless steel, powder-coated ferrous metals, carbon fiber, plastic, fiber glass, polymers, and/or compounds thereof, for example. The components are also preferably constructed from materials that are anti-microbial, hygienic, easy to clean, and suitable for wet locations. In a specific embodiment, the chair base 1 may include a plurality of legs 2, such as three, four, five, or more legs. In a specific embodiment, the chair base 1 may include five legs to provide improved stability.

Figure 5:
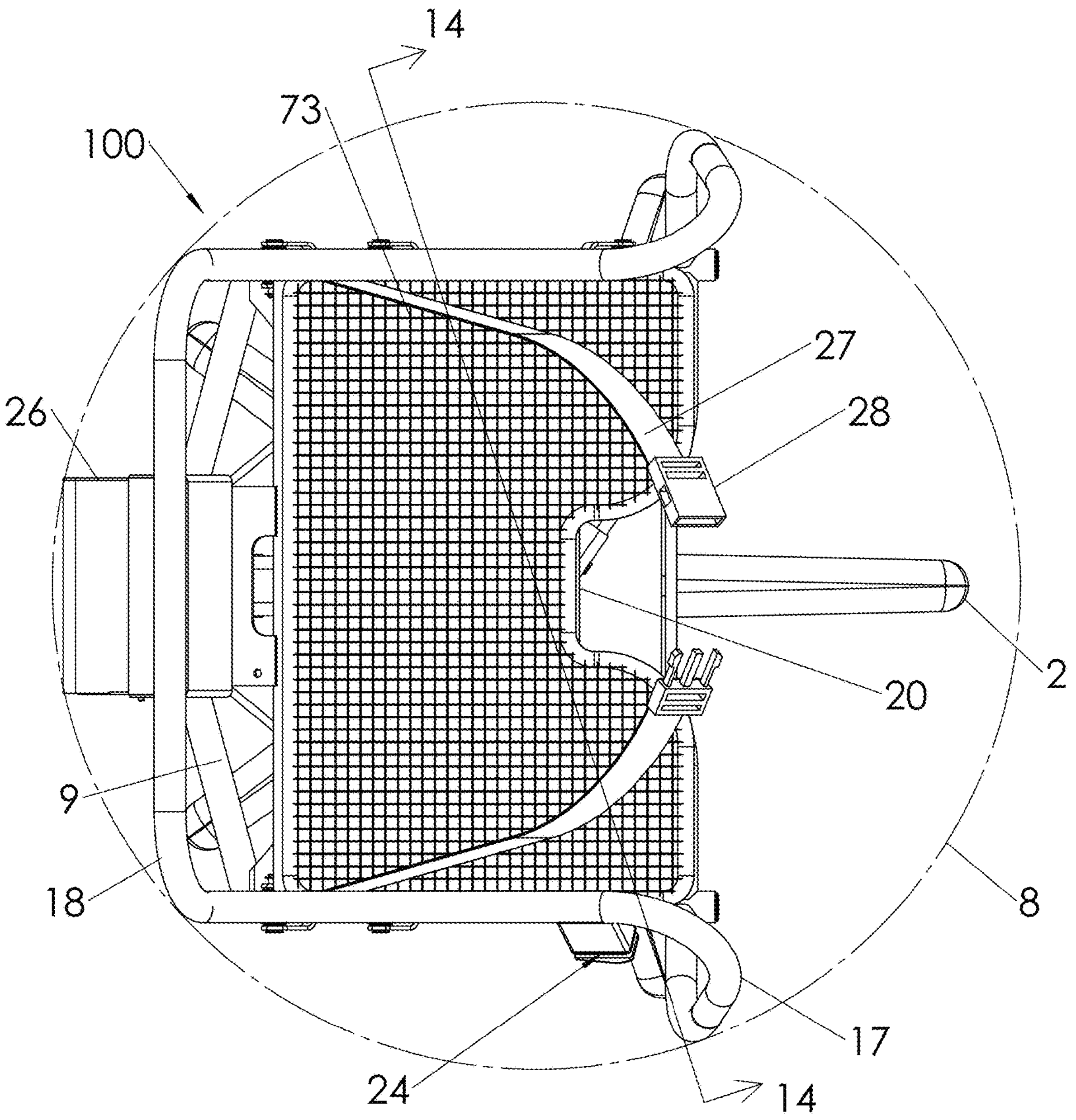
FIG. 5 is a top view of the chair with the seat assist height in its lowered or sitting position as shown in FIGS. 1 and 3.
Figure 6:
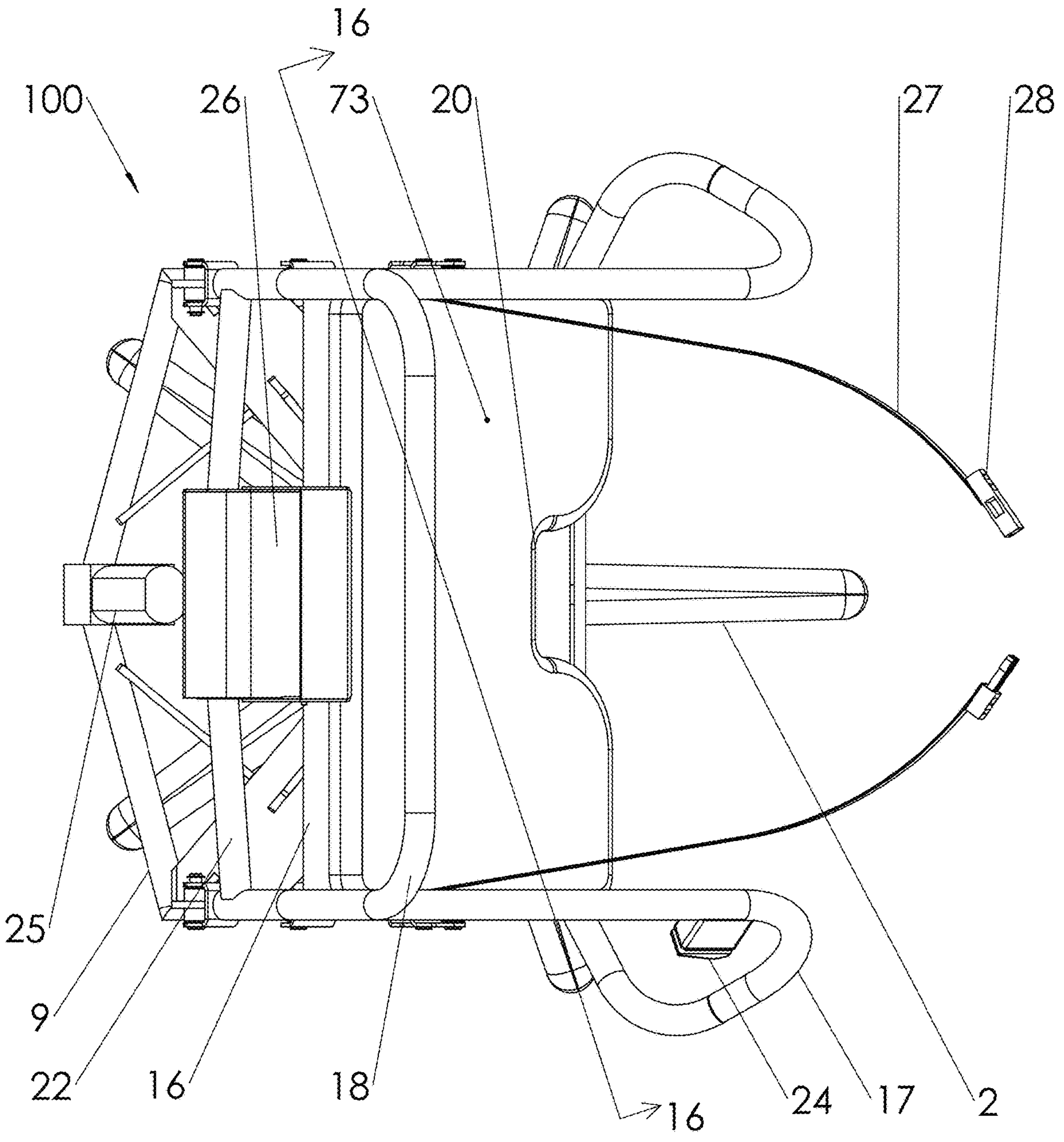
FIG. 6 is a top view of the chair with the seat assist height in its upper or inclined forward position as shown in FIGS. 2 and 4.

As shown for example in FIG. 5, in a specific embodiment, the seat frame 16 may be provided with a recessed or notched opening 20 at a front central location of the seat frame 16 to facilitate washing between the user's legs. A seat 19 may be attached to an upper surface of the seat frame 16 to provide a planar support surface on which a user of the chair 100 may sit. In a specific embodiment, a seat cushion 73 may be removably attached to a top surface of the seat 19, such as through the use of Velcro® fasteners. In a specific embodiment, the seat cushion 73 may be padded with ethylene vinyl acetate (EVA) foam. In a specific embodiment, an upper surface of the seat cushion 73 may be constructed from or textured with a non-slip, non-hypoallergenic, easy to clean material.

Figure 7:
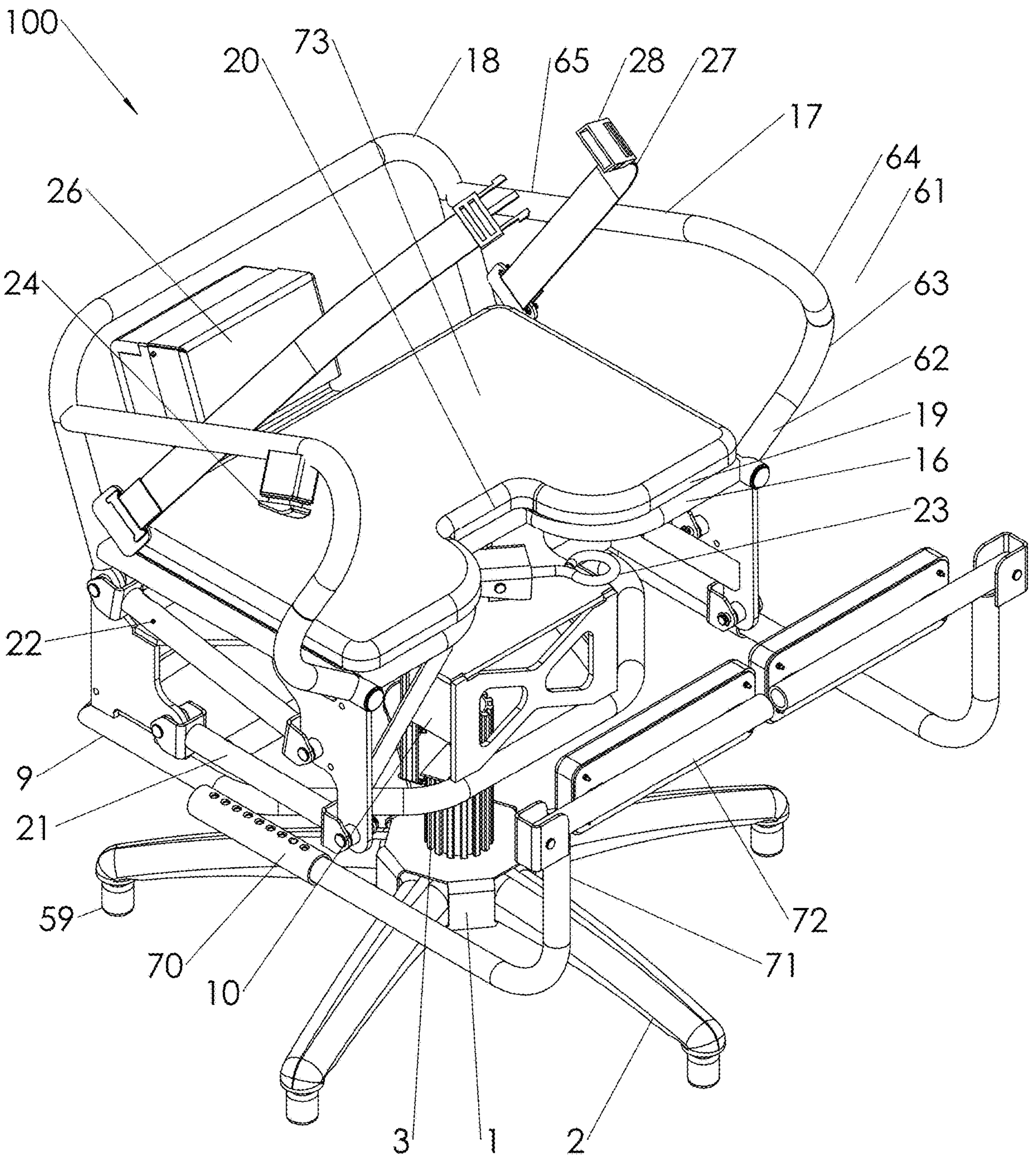
FIG. 7 is a perspective view of the shower chair shown in FIGS. 1-6 taken from the front right side of the shower chair with the seat in its lowered or sitting position.

As also shown for example in FIGS. 5 and 7, in a specific embodiment, the chair 100 may be provided with an arm rest frame 17 comprising left and right arm rests that also function as handles that may be grasped by the user when the chair is in use. In a specific embodiment, forward ends of the left and right sides of the arm rest frame 17 may be provided in outwardly curved configurations to allow for lateral movement of the user's legs beyond where they would be restricted if the forward ends of the arm rest frame 17 were straight up and down adjacent the right and left sides of the seat frame 16. This feature provides improved access for cleaning the groin area.

In a specific embodiment, as shown for example in FIG. 7, a left side of the arm rest frame 17 may include an outwardly curved arcuate support member 61 connected to and extending upwardly and outwardly away from the seat frame 16. In a specific embodiment, the arcuate support member 61 may include a generally straight section 62, a first generally arcuate section 63, and a second generally arcuate section 64. In a specific embodiment, the generally straight section 62 may include a first end connected to the seat frame 16 and extend upwardly and outwardly away from the seat frame 16 at an inclined angle. A second end of the generally straight section 62 may be connected to a first end of the first arcuate section 63, with a convex transition thereof that points away from the seat frame 16. A second end of the first arcuate section 63 may be connected to a first end of the second arcuate section 64. In a specific embodiment, the second arcuate section 64 may lie in an inclined plane leaning toward an upper surface of the cushioned seat 19. In a specific embodiment, a second end of the second arcuate section 64 may be connected to an arm rest portion 65 of the arm rest frame 17. In a specific embodiment, the right side of the arm rest frame may be a mirror image of the left side of the arm rest frame 17, as described above. In a specific embodiment, the arm rest frame 17 may include a rear support 18 to provide stability and safety in the rearward direction.

The swivel base 9 is connected to the gas spring 4 and supported by the gas spring 4 and the central support column 3. The swivel base 9 may include a swivel lock mechanism 10 and a height adjustment lever 23 adapted for engagement with the central support column 3 to actuate the gas spring 4 to raise and lower the swivel base 9 in relation to the chair base 1. The height of the swivel base 9 relative to the chair base 1 depends on the extension of the gas spring 4 in the central support column 3. A sitting height position of the shower chair 100 can be adjusted by activating the height adjustment lever 23 on the front of the swivel base 9.

In a specific embodiment, the swivel base 9 is connected to the seat frame 16 by a lower leg assembly 21 and an upper leg assembly 22, and is supported by a linear actuator 25. In a specific embodiment, the linear actuator 25 may be an electric linear actuator containing an electric motor. In another specific embodiment, the linear actuator 25 may be a hydraulic cylinder. In another specific embodiment, the linear actuator 25 may be a pneumatic cylinder.

Figure 9:
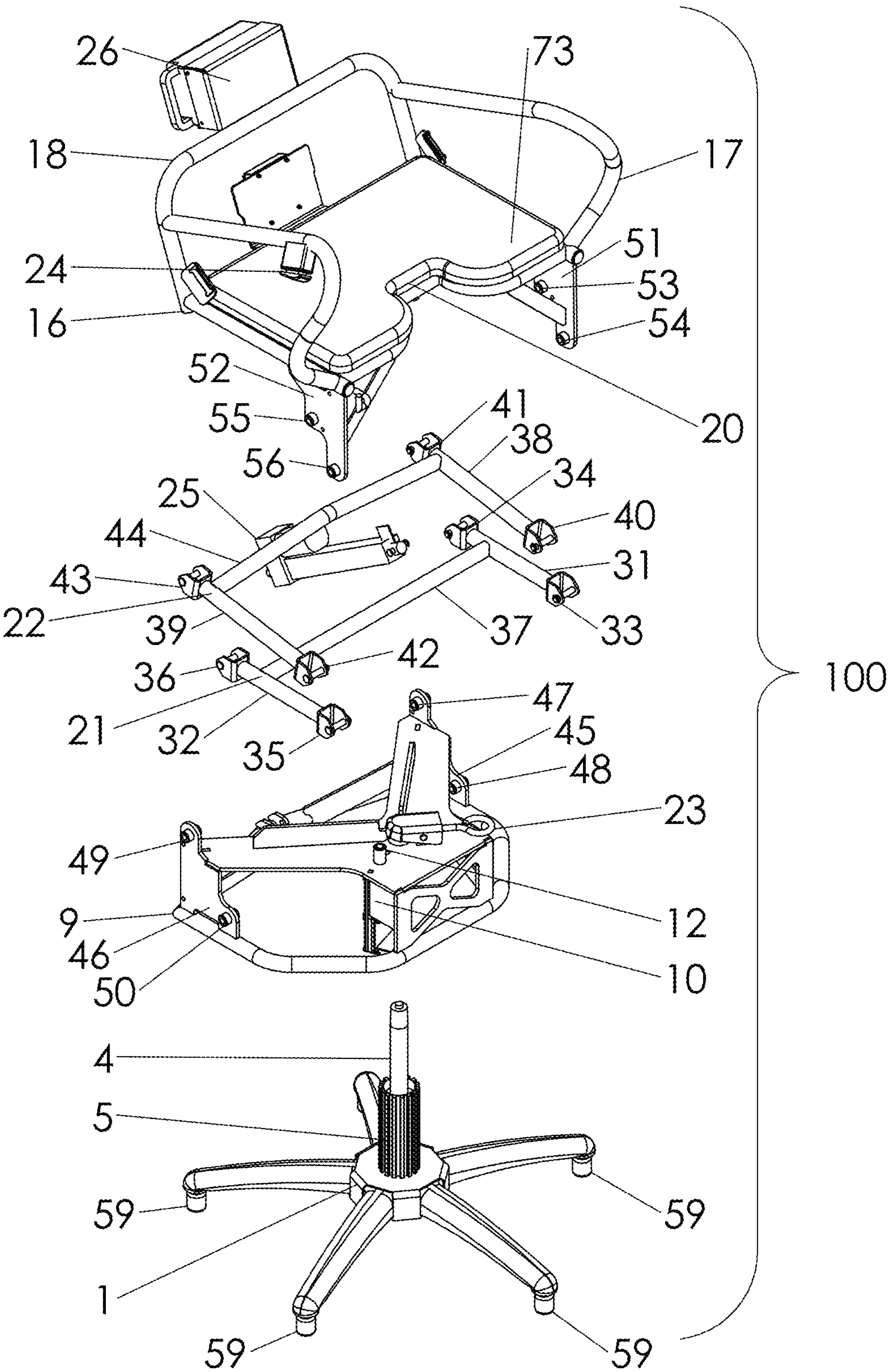
FIG. 9 is an exploded perspective view showing the various components of the shower chair shown in FIGS. 1-8.
Figure 10:
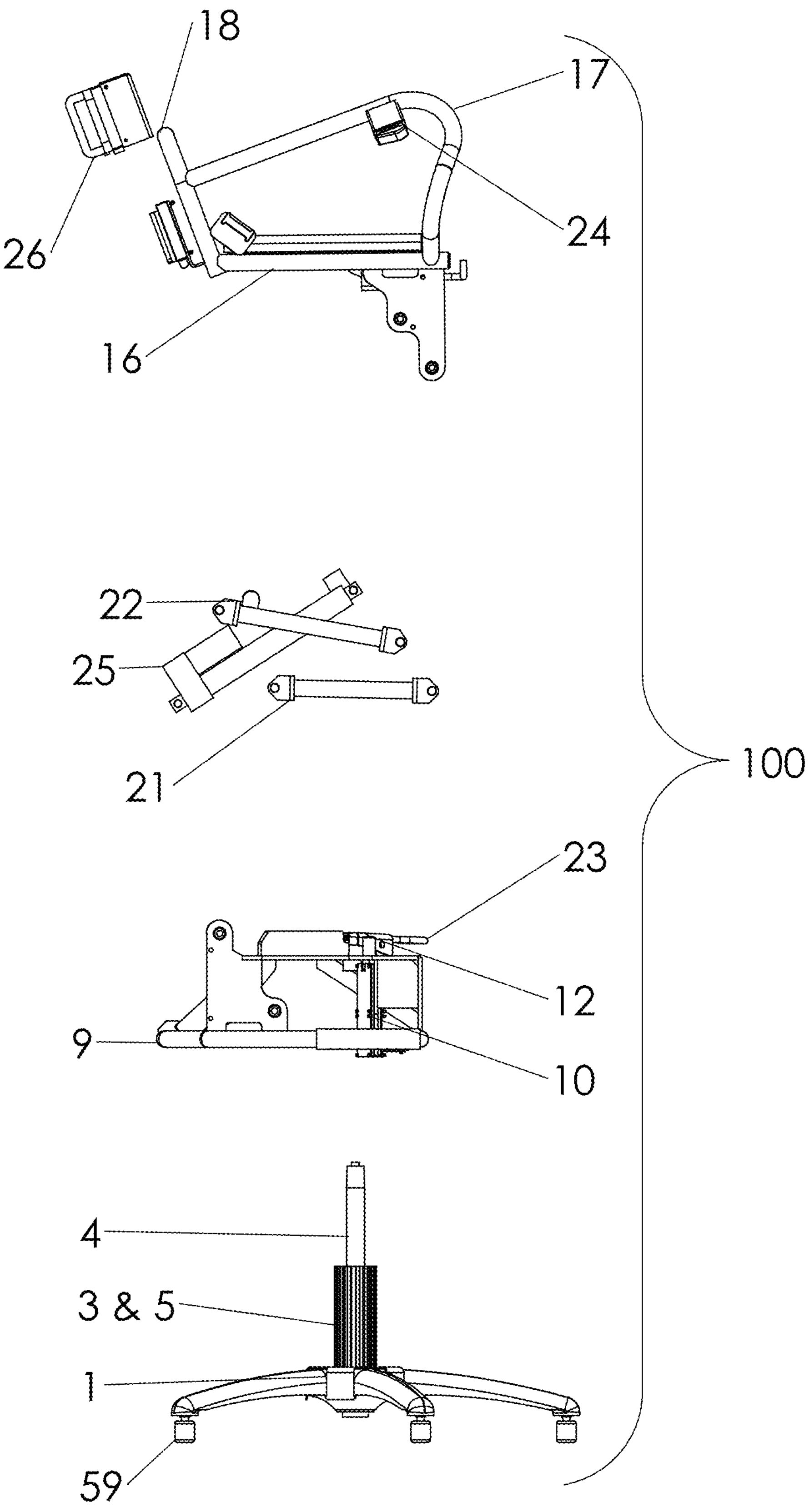
FIG. 10 is an exploded side view showing the various components of the shower chair shown in FIGS. 1-8.

As best shown in FIGS. 9, in a specific embodiment, the lower leg assembly 21 may comprise a left arm 31 and a right arm 32. The left arm 31 may have a first connector 33 and a first end of the left arm 31 and a second connector 34 at a second end of the left arm 31. The right arm 32 may have a first connector 35 at a first end of the right arm 32 and a second connector 36 at a second end of the right arm 32. The lower leg assembly 21 may include a transverse support member 37 disposed between and connecting the left arm 31 to the right arm 33.

Still referring to FIG. 9, in a specific embodiment, the upper leg assembly 22 may comprise a left arm 38 and a right arm 39. The left arm 38 may have a first connector 40 and a first end of the left arm 38 and a second connector 41 at a second end of the left arm 38. The right arm 39 may have a first connector 42 at a first end of the right arm 39 and a second connector 43 at a second end of the right arm 39. The upper leg assembly 22 may include a transverse support member 44 disposed between and connecting the left arm 38 to the right arm 39.

Still referring to FIG. 9, in a specific embodiment, the swivel base 9 may include a left upstanding support member 45 and a right upstanding support member 46. The left upstanding support member 45 may include an upper aperture 47 and a lower aperture 48. The right upstanding support member 46 may include an upper aperture 49 and a lower aperture 50.

Still referring to FIG. 9, in a specific embodiment, the seat frame 16 may include a left downwardly extending support member 51 and a right downwardly extending support member 52. The left downwardly extending support member 51 may include an upper aperture 53 and a lower aperture 54. The right downwardly extending support member 52 may include an upper aperture 55 and a lower aperture 56.

The lower leg assembly 21, the upper leg assembly 22, and the linear actuator 25 function together to connect the seat frame 16 to the swivel base 9, and facilitate movement of the seat 19 between a sitting position and a raised or forward inclined position, as shown for example in FIGS. 1-4. The manner in which, in a specific embodiment, the lower leg assembly 21, the upper leg assembly 22, and the linear actuator 25 may be connected to the seat frame 16 and to the swivel base 9 will now be explained.

In a specific embodiment, the first connector 40 on the first end of the left arm 38 of the upper leg assembly 22 may be engaged with the upper aperture 53 on the left downwardly extending support member 51 on the seat frame 16. In a specific embodiment, the first connector 33 on the first end of the left arm 31 of the lower leg assembly 21 may be engaged with the lower aperture 54 on the left downwardly extending support member 51 on the seat frame 16. In a specific embodiment, the first connector 42 on the first end of the right arm 39 of the upper leg assembly 22 may be engaged with the upper aperture 55 on the right downwardly extending support member 52 on the seat frame 16. In a specific embodiment, the first connector 35 on the first end of the right arm 32 of the lower leg assembly 21 may be engaged with the lower aperture 56 on the right downwardly extending support member 52 on the seat frame 16.

In a specific embodiment, the second connector 41 on the second end of the left arm 38 of the upper leg assembly 22 may be engaged with the upper aperture 47 on the left upstanding support member 45 on the swivel base 9. In a specific embodiment, the second connector 43 on the second end of the right arm 39 of the upper leg assembly 22 may be engaged with the upper aperture 49 on the right upstanding support member 46 on the swivel base 9. In a specific embodiment, the second connector 34 on the second end of the left arm 31 of the lower leg assembly 21 may be engaged with lower aperture 48 of the left upstanding support member 45 on the swivel base 9. In a specific embodiment, the second connector 36 on the second end of the right arm 32 of the lower leg assembly 21 may be engaged with the lower aperture 50 of the right upstanding support member 46 on the swivel base 9.

Figure 8:
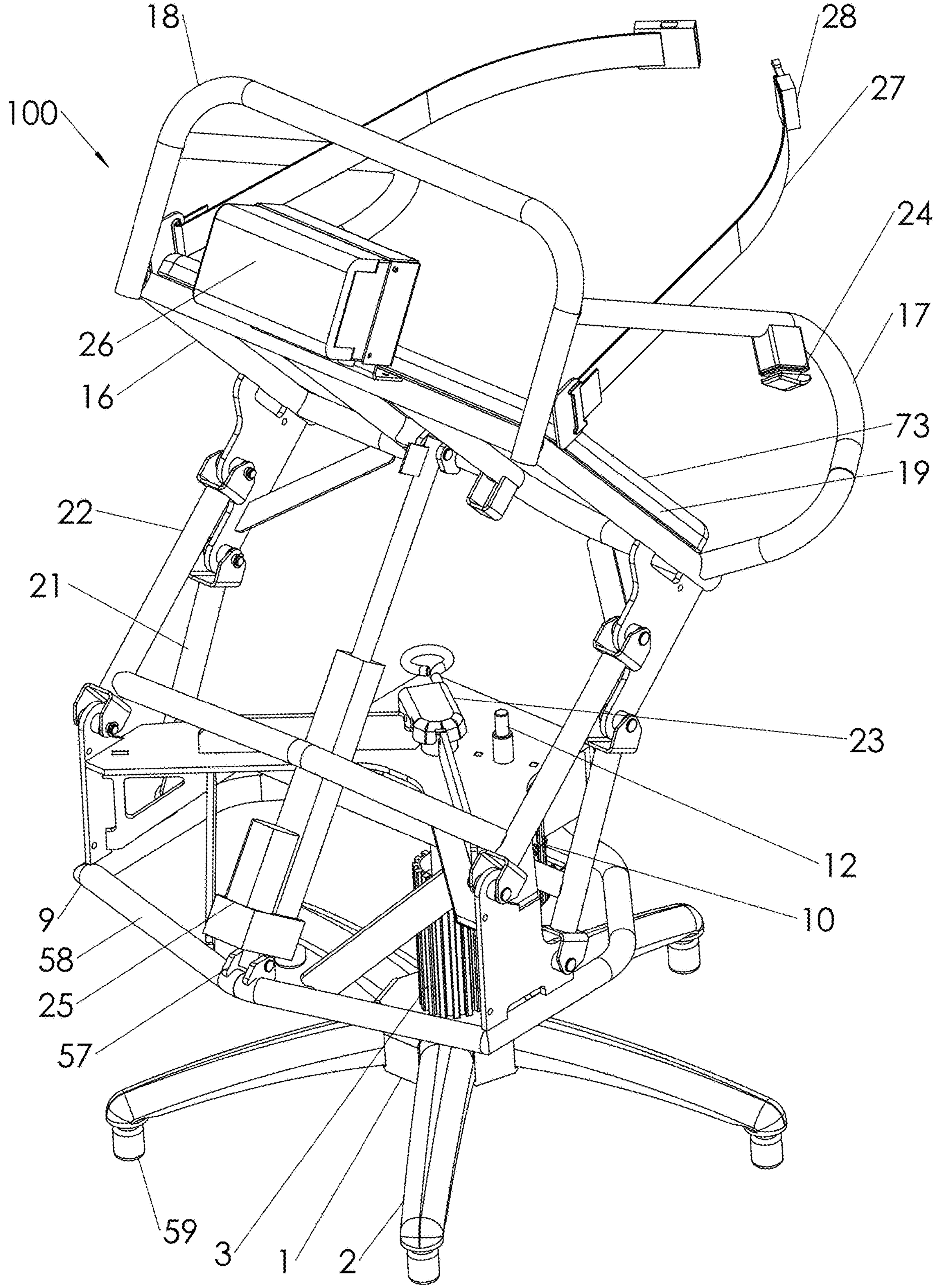
FIG. 8 is a perspective view of the shower chair shown in FIGS. 1-6 taken from the rear right side of the shower chair with the seat assist height in its upper or inclined forward position.

In a specific embodiment, a first end of the linear actuator 25 may be pivotably connected to the swivel base 9, such as to a connector 57 affixed to a rear transverse member 58 that may form part of the swivel base 9 (see FIG. 8). In a specific embodiment, a second end of the linear actuator 25 may be pivotably connected to the seat frame 16, such as at a central location at the front of the seat frame 16, such as adjacent a recess 20 in the seat frame 16, and corresponding recesses in the seat 19 and the seat cushion 73.

In a specific embodiment, the various connections between the leg assemblies 21 and 22, the linear actuator 25, the seat frame 16, and the swivel base 9 may be made by a dowel pin and cotter pin, or any other known attachment mechanisms.

In a specific embodiment, each of the legs 2 on the chair base 1 may be provided with a foot support 59. In a specific embodiment, each foot support 59 may be a self-leveling, non-skid foot member, as opposed to a roller, for example. In a specific embodiment, each foot support 59 may be a self-leveling foot member that may have tiny hydraulic dampers, such as table leg stabilizers of the type available under the Flat® brand from Flat Tech Inc. (USA) of Schaumburg, Illinois (www.flattech.com). Use of technology such as this allows for self-leveling of the shower chair 100 on uneven surfaces that may exist on a shower flower, such due to uneven floor tile surfaces that may include pebbles or stones, for example. In another specific embodiment, each foot support 59 may comprise locking casters to allow the chair 100 to roll into and out of the shower.

Figure 2:
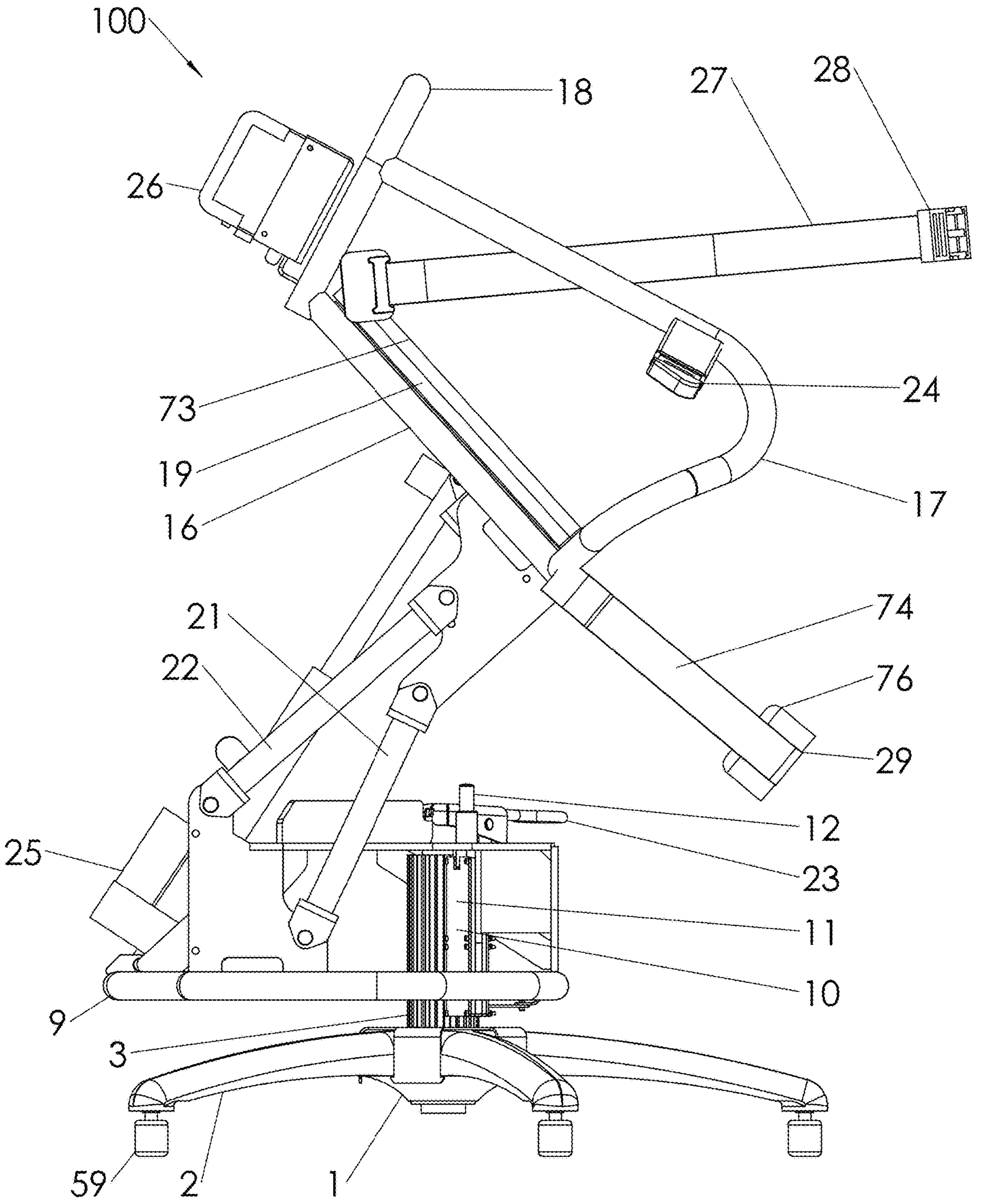
FIG. 2 is a side view of the shower chair shown in FIG. 1, and illustrates the seat assist height moved to a raised or inclined position in which the seat is tilted in a forward position, and the chair frame height still in a lowered position.
Figure 3:
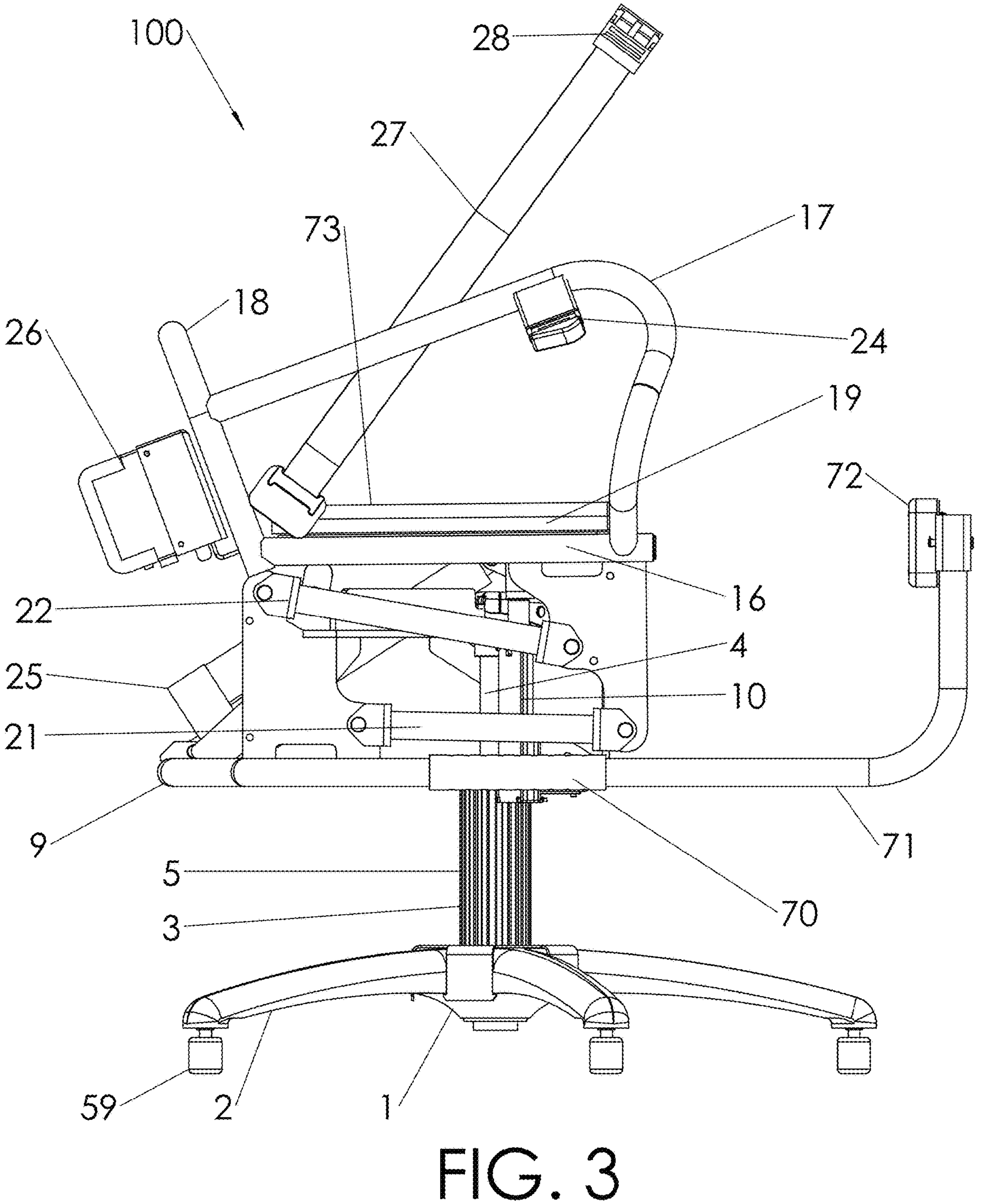
FIG. 3 is a side view similar to FIGS. 1 and 2, and illustrates the seat assist height in a lowered or sitting position but showing the chair frame height in a raised or upper position.
Figure 4:
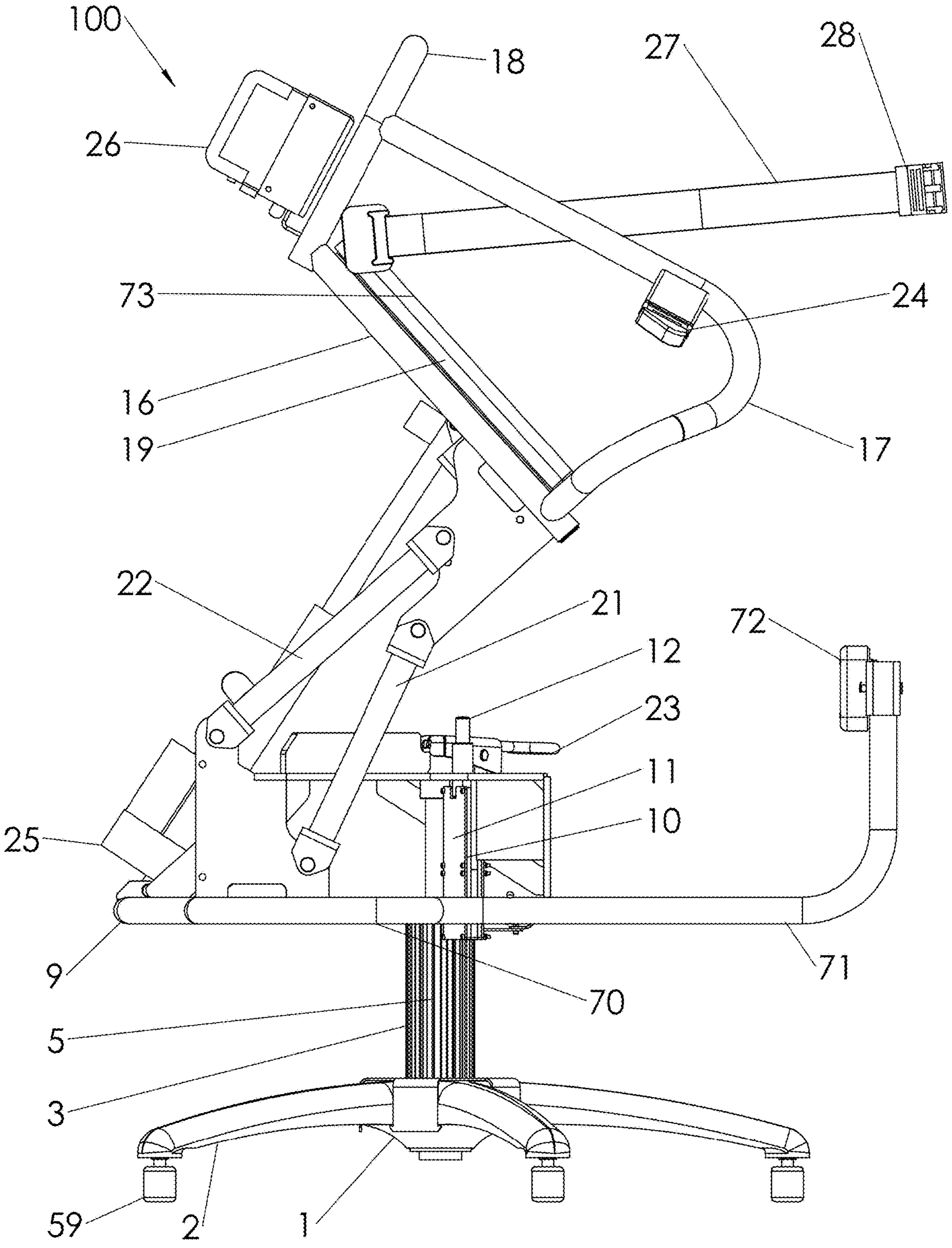
FIG. 4 is a side view similar to FIGS. 1-3, and illustrates the seat assist height in its raised or inclined position tilted forward, and the chair frame height in its raised or upper position.

In operation, the linear actuator 25 is adapted to move the seat frame 16 relative to the swivel base 9, and to thereby move the seat frame 16 from a first, or down/sitting, position as shown in FIG. 1, to a second, or up/inclined forward, position as shown in FIG. 2 (and to and from various intermediate positions between the first and second positions). The particular position of the seat frame 16 as it moves up and down may be referred to as the "assist height." In a specific embodiment, the linear actuator 25 is in electrical communication with a source of electrical power, such as a removable rechargeable battery 26 attached to the chair 100. In a specific embodiment, the rechargeable battery 26 may be conveniently removable for recharging. In this specific embodiment, the linear actuator 25 is also in electrical communication with a control switch 24 attached to the chair 100. All electrical components and connections are sealed and waterproof. The control switch 24 is used to control the linear actuator 25 to move the seat frame 16 relative to the swivel base 9. The control switch 24 may be attached to an arm rest 17 on the seat frame 16. In this manner, a person sitting on the chair 100 can use the control switch 24 to raise and lower the seat frame 16, and thereby use the chair 100 to control the "assist height" to assist the person in raising to a standing position and/or lowering to a seated position. In a specific embodiment, the control switch 24 is positioned on the arm rest frame 17 so that the user does not need to let go of the arm rest frame 17 to operate the control switch 24.

Figure 11:
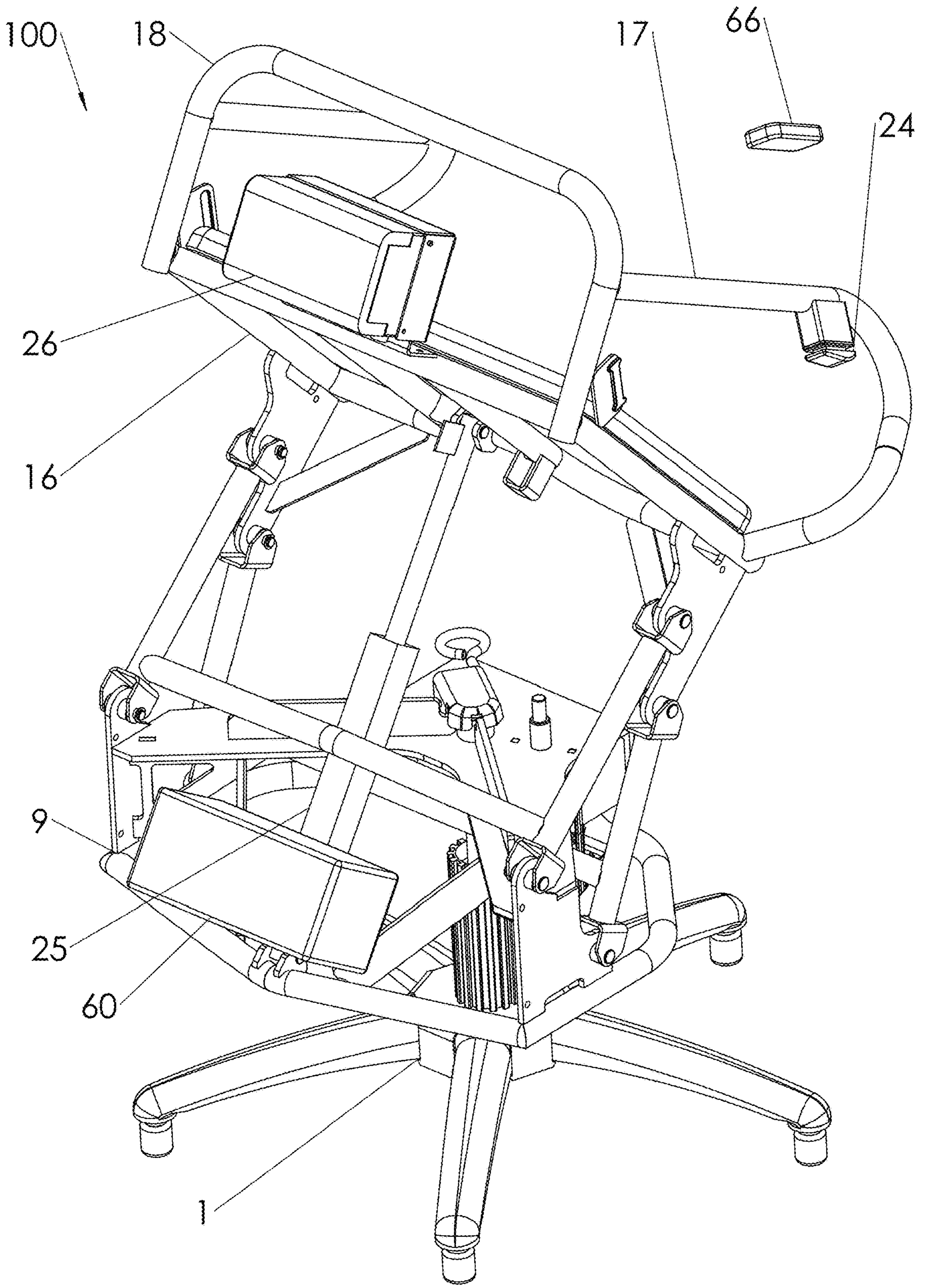
FIG. 11 is a perspective view of another specific embodiment of a shower chair showing an alternative hydraulic or pneumatic actuator as well as an optional remote control device.

As noted above, other embodiments of the linear actuator, such as hydraulic or pneumatic actuators consisting of a cylinder with integrated motor, pump (hydraulic or pneumatic) and reservoir 60 as shown in FIG. 11, which motor maybe powered by the removable rechargeable battery 26. These alternative actuators are also encompassed within the scope of the present inventions, which may include corresponding sources of pressurized fluid or compressed air and associated control switches to control movement of the seat frame 16 between its various "assist" positions.

The swivel base 9 and seat frame 16 are free to swivel when the seat frame 16 is in its retracted (lowered) position. In a specific embodiment, the swivel base 9 and seat frame 16 may have an unlimited 360 degree swivel action with respect to the chair base 1. In a specific embodiment, when the seat frame 16 is extended upwardly away in a forward inclined position away from its retracted (lowered/sitting) position, the swivel lock mechanism 10 on the swivel base 9 engages the swivel lock spline 5 mounted on the chair base 1 support column 3 and prevents swivel motion between the chair base 1 and the swivel base 9. That is, in a specific embodiment, the swivel base 9 automatically locks to the chair base 1 as the seat frame 16 is raised away from the seated position. Once locked, the swivel base 9 and seat frame 16 can no longer swivel or rotate and thus they become a secure support for the user to hold onto as the linear actuator 25 raises the seat frame 16 and user to a standing position. When the seat frame 16 is moved back down into its lower or seated position, the seat frame 16 automatically unlocks or disengages the swivel lock mechanism 10 to again allow for swivel action of the swivel base 9 and seat frame 16 relative to the chair base 1. This aspect of this specific embodiment of the present inventions does not require the user to engage or disengage any locking mechanism to secure the swivel base 9 to the chair base 1 before moving upward to a standing position or to release the swivel base 9 from the chair base 1 when the seat frame 16 has moved back down to its seated position; this happens automatically.

Another aspect of the present inventions that may be used in conjunction with a lift assist chair 100 or as part of other structures is the swivel lock mechanism 10, which may function to prevent rotation between two components (e.g., the seat 19 and the chair base 1) when the two components move apart from one another. As discussed above in the context of the lift assist chair 100, when a user wants to stand up or sit down, the user holds onto the arm rests 17 with both hands and activates the control switch 24 to extend or retract the linear actuator 25 and thus raise or lower the "Assist Height" of the seat 19. The user holds onto the arm rests 17 and relies on them for stabilization. The user may accidentally fall if the seat 19 and arm rests 17 were free to swivel relative to the floor on which they are standing. Thus, in a specific embodiment, it may be desirable, in certain circumstances, to prevent the seat 19 from swiveling relative to the chair base 9. When the "Assist Height" is extended (i.e., when the user is in the process of sitting down or standing up), then both of the user's hands will be holding on to the arm rests 17 for support, and thus are not available to activate a locking mechanism that must be manually operated. Also, the user may forget to activate a manually-operated lock. Thus, in a specific embodiment, it may be desirable for the swivel lock to engage and dis-engage automatically. In a specific embodiment, it may be desirable for the swivel lock mechanism to remain securely engaged when the seat 19 is even marginally extended and for the locking mechanism to remain dis-engaged when the seat is fully down in its sitting position, i.e., when the linear actuator is in its fully retracted position. It may also be desirable for the locking mechanism to function for all "Sitting Height" positions or adjustments. In a specific embodiment, the present inventions may provide a solution to the above problems by providing an automatic engage/dis-engage swivel locking mechanism that prevents the seat 19 from swiveling when the "Assist Height" is extended away from the fully retracted down position. The swivel lock mechanism may also function such that the chair base 1 and swivel base 9 remain engaged or disengaged in all positions of the "Sitting Height." These aspects of the present inventions will now be described in more detail with reference to FIGS. 13-19.

Figure 13:
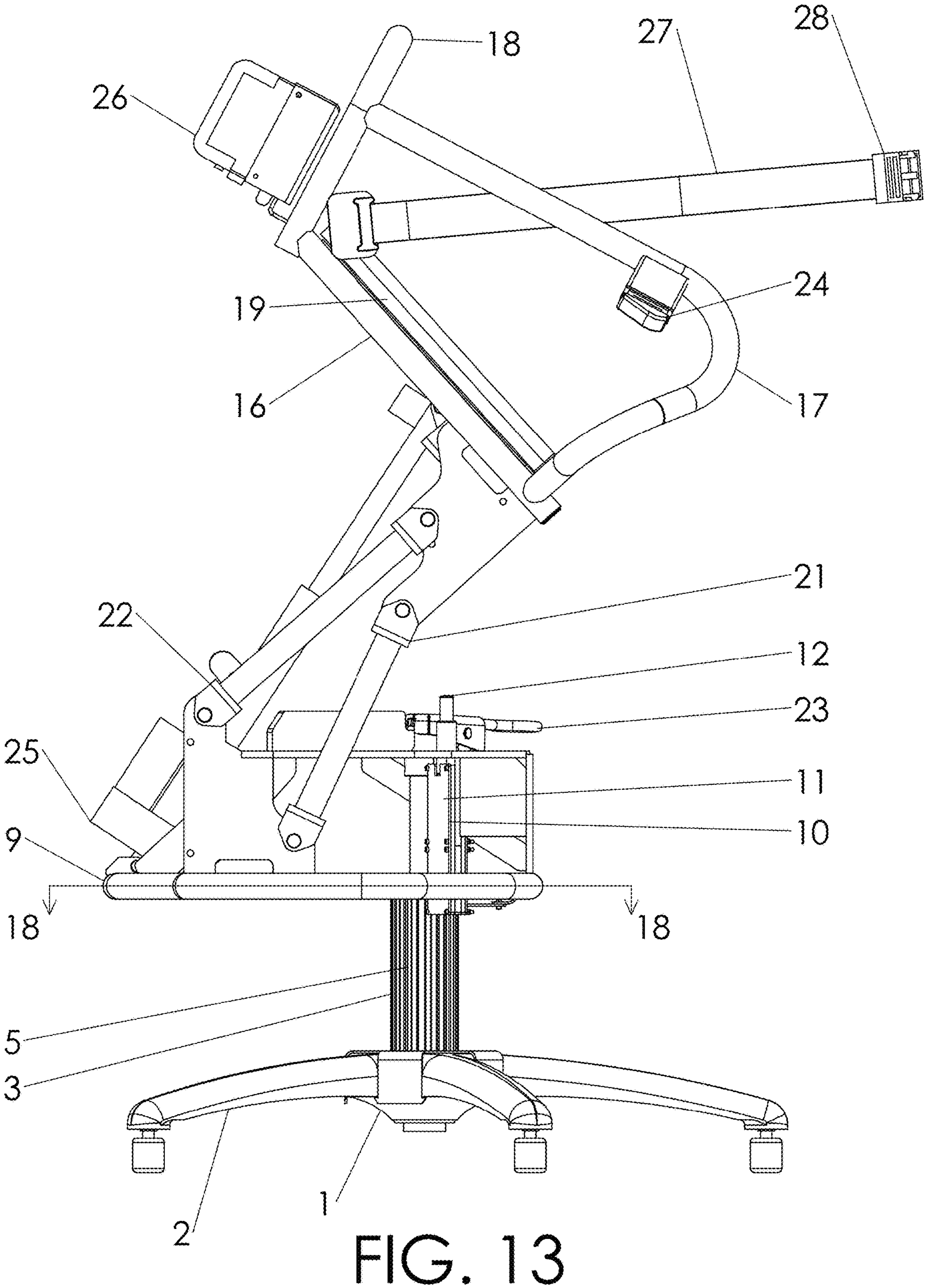
FIG. 13 is a side view similar to FIG. 4 but without the knee stop.
Figure 14:
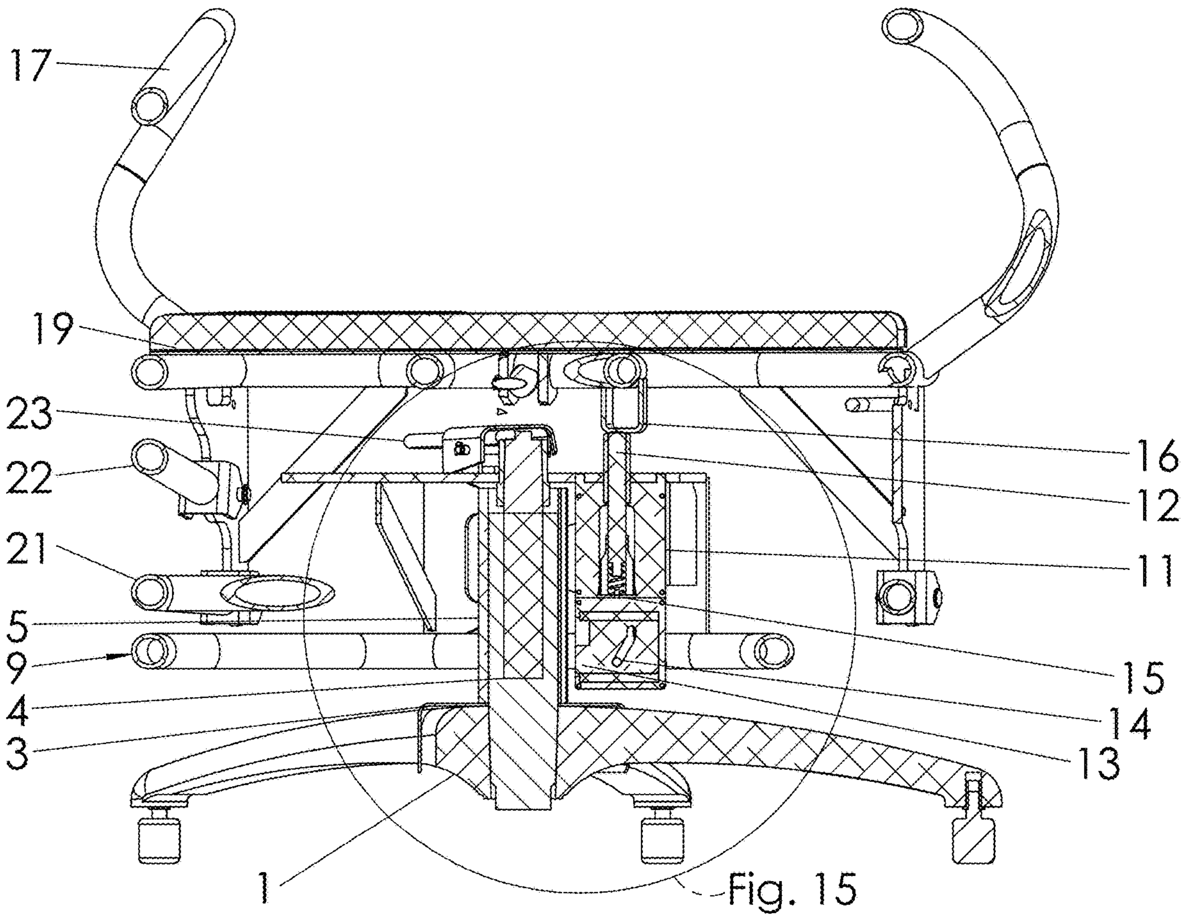
FIG. 14 is a cross-sectional view taken along lines 14-14 in FIG. 5.

With reference to FIG. 13, the chair base 1 stands on the floor and includes the central support column 3 (with a gas spring 4 that connects the chair base 1 to the swivel base 9), as discussed above. The chair base 1 is fixed relative to the floor. The central column 3 has a spline 5 feature around the external cylindrical surface of the central column 3 and this surface is thus also fixed relative to the floor.

Figure 15:
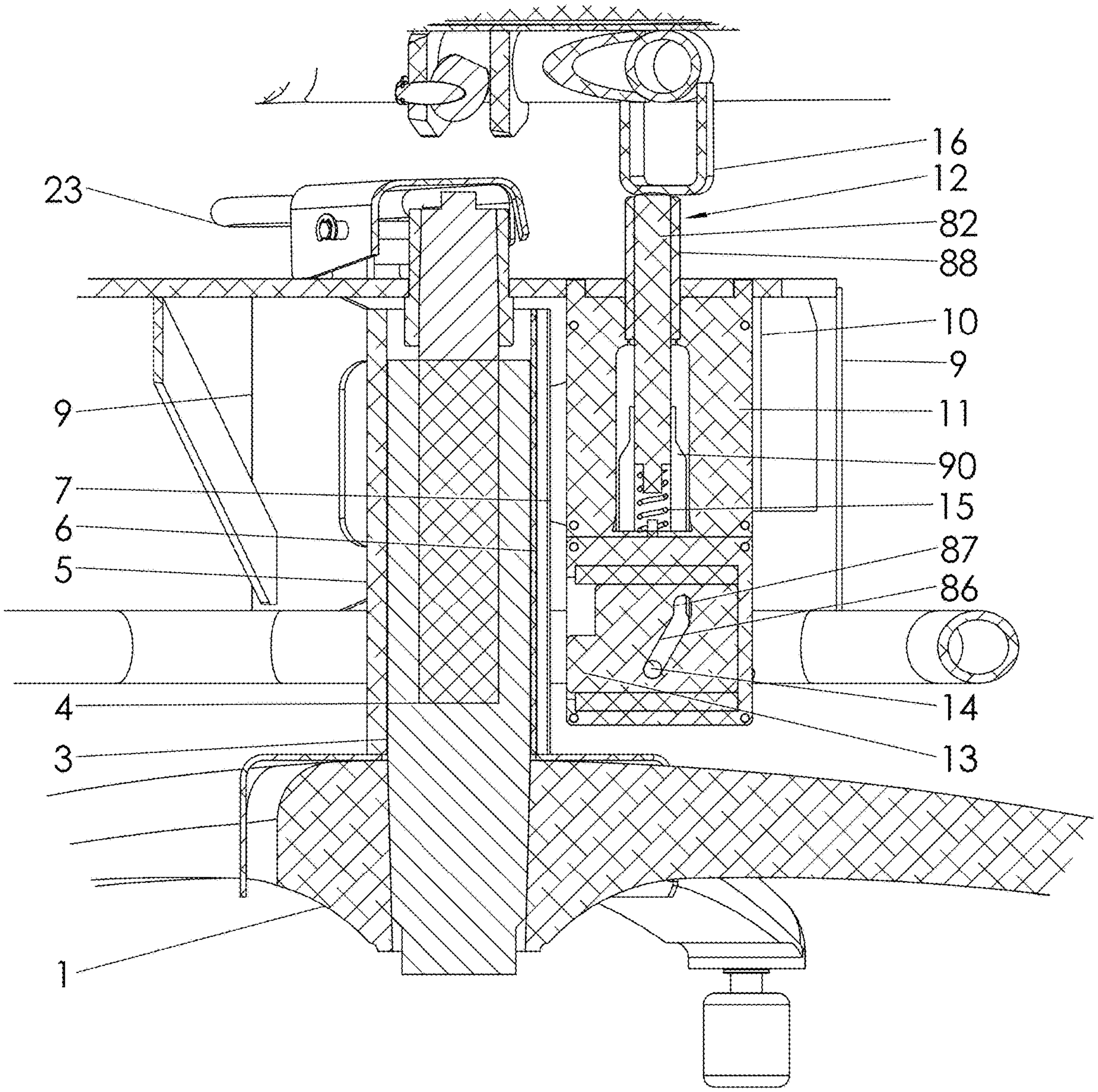
FIG. 15 is a cross-sectional enlarged view of the portion of FIG. 14 identifed as FIG. 15.
Figure 16:
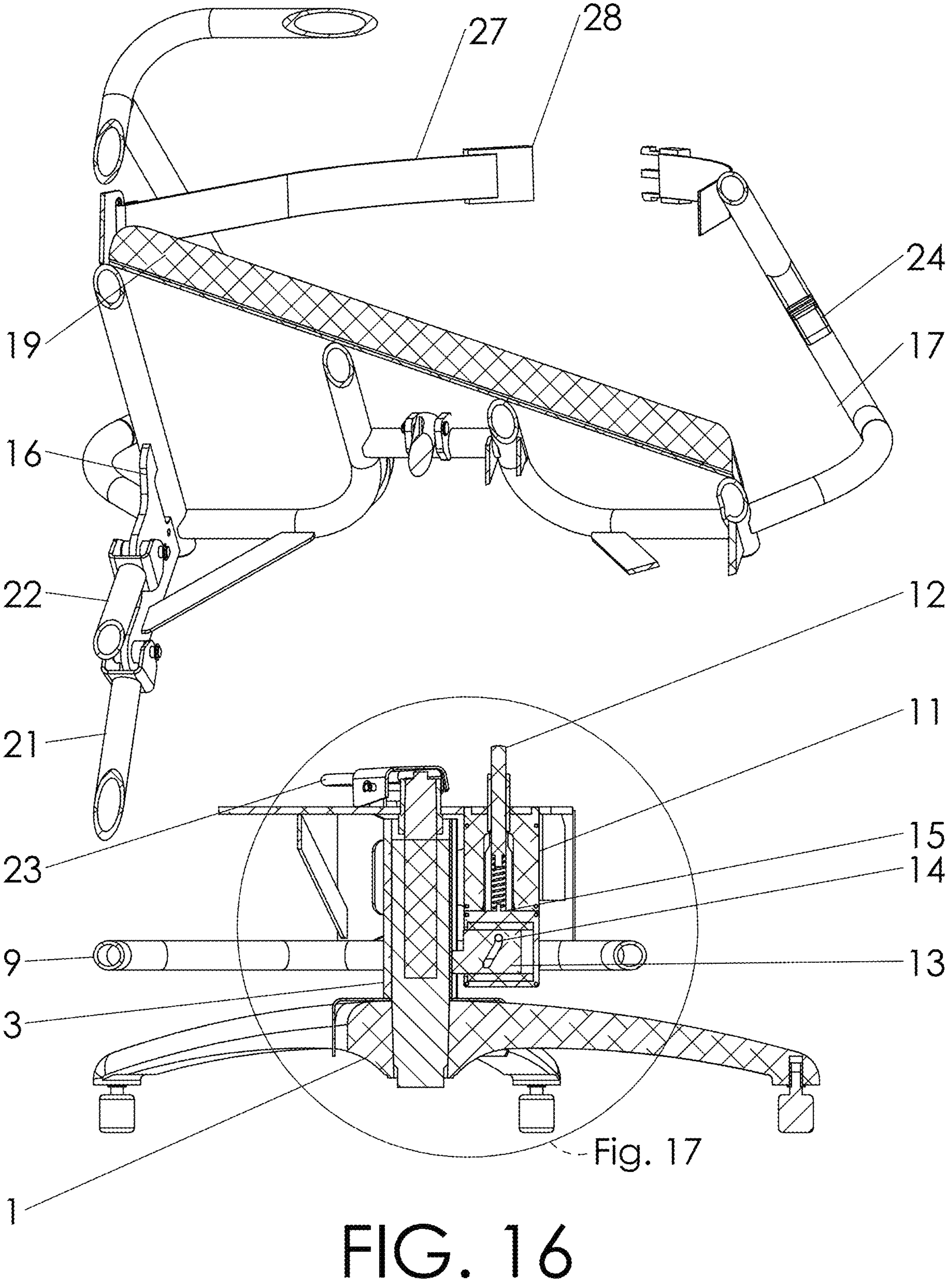
FIG. 16 is a cross-sectional view taken along lines 16-16 in FIG. 6.
Figure 17:
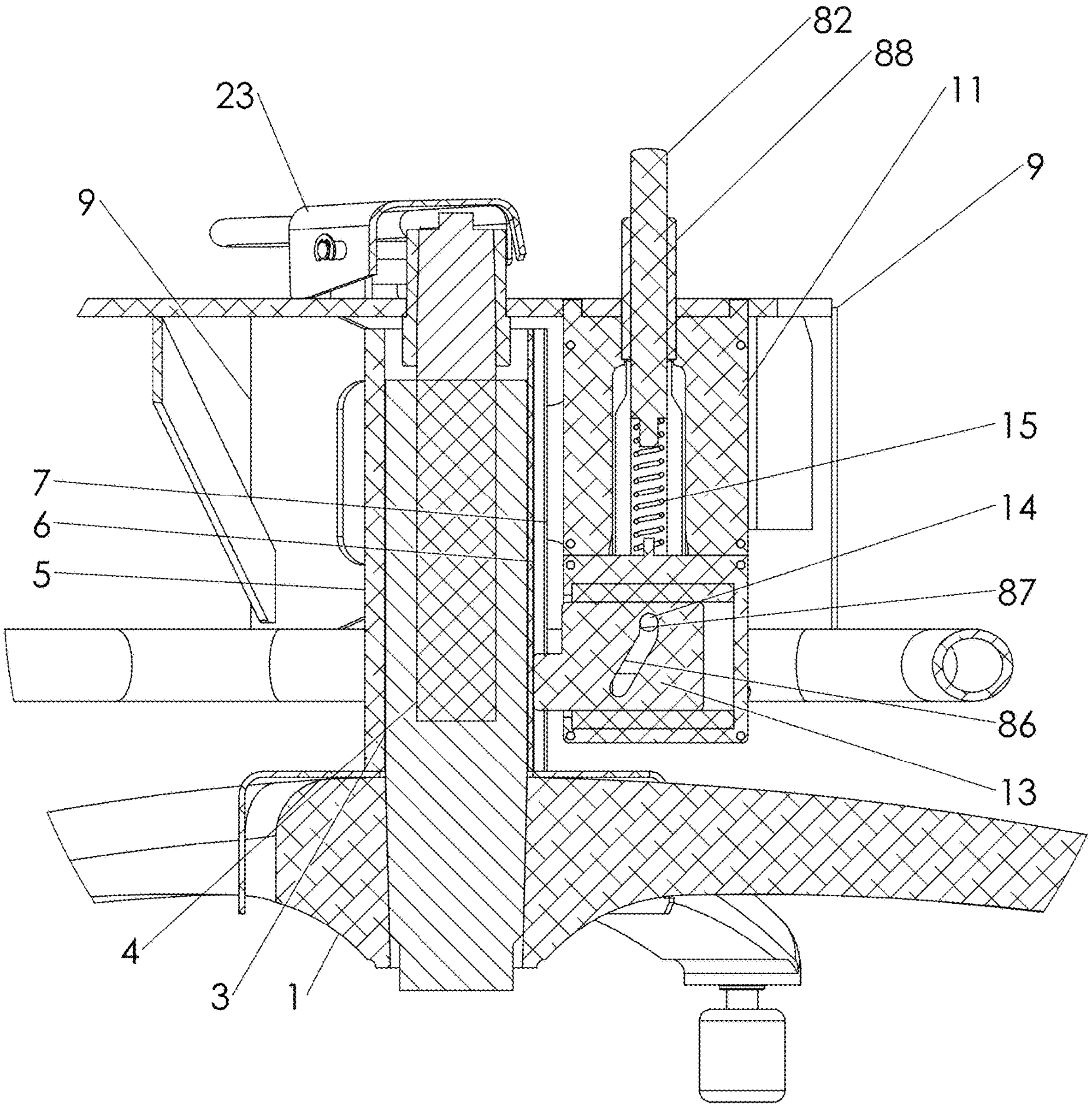
FIG. 17 is a cross-sectional enlarged view of the portion of FIG. 16 identified as FIG. 17.
Figure 18:
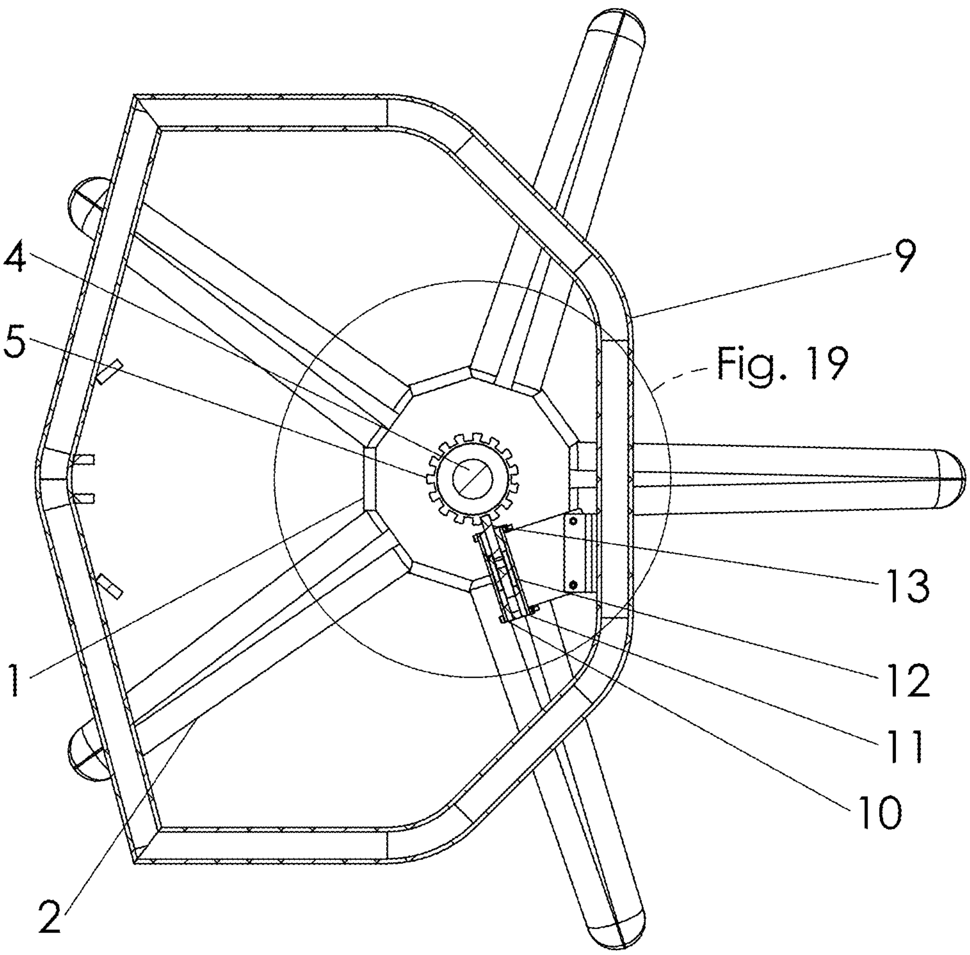
FIG. 18 is a cross-sectional view taken along lines 18-18 in FIG. 13.
Figure 19:
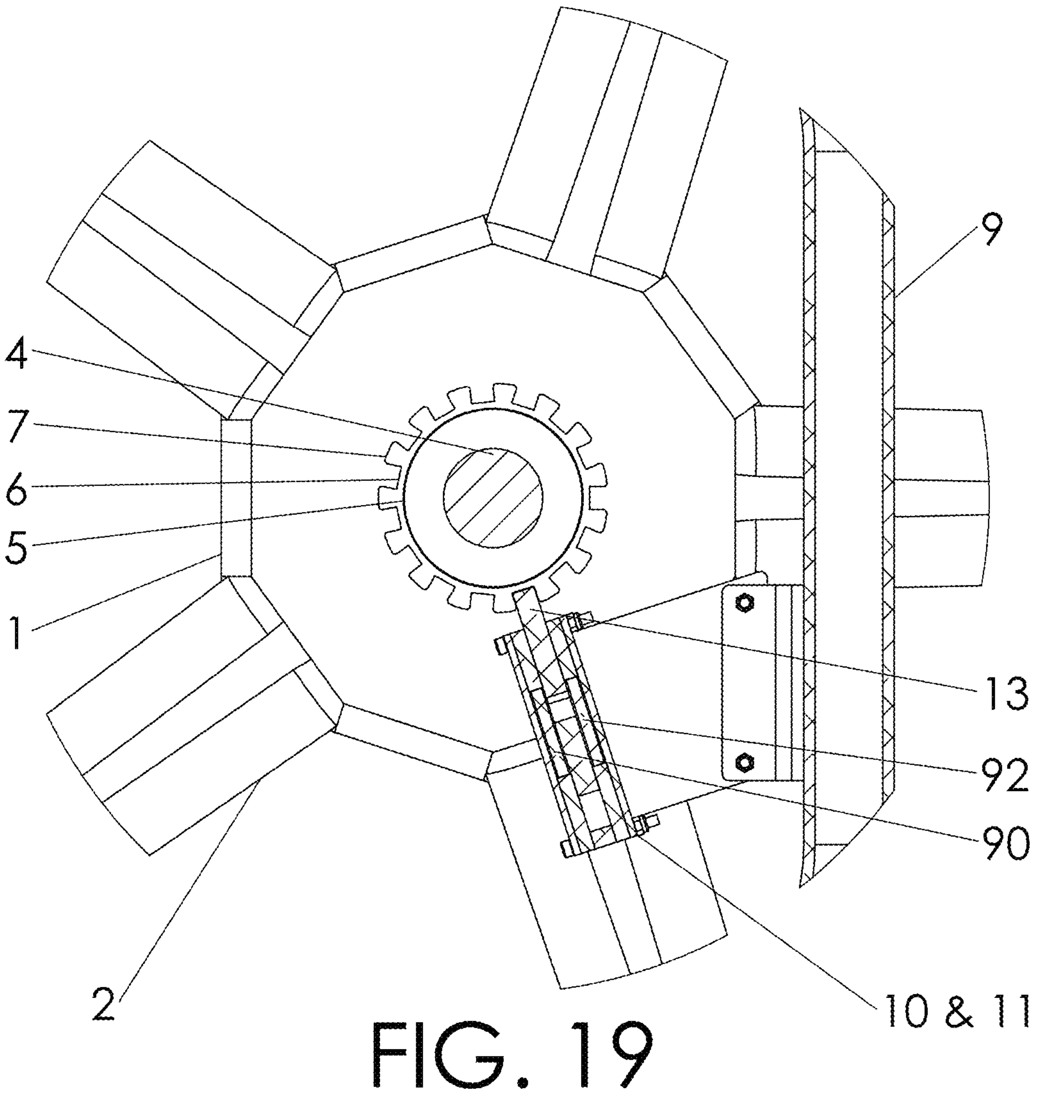
FIG. 19 is a cross-sectional enlarged view of the portion of FIG. 18 identified as FIG. 19.
Figure 20:
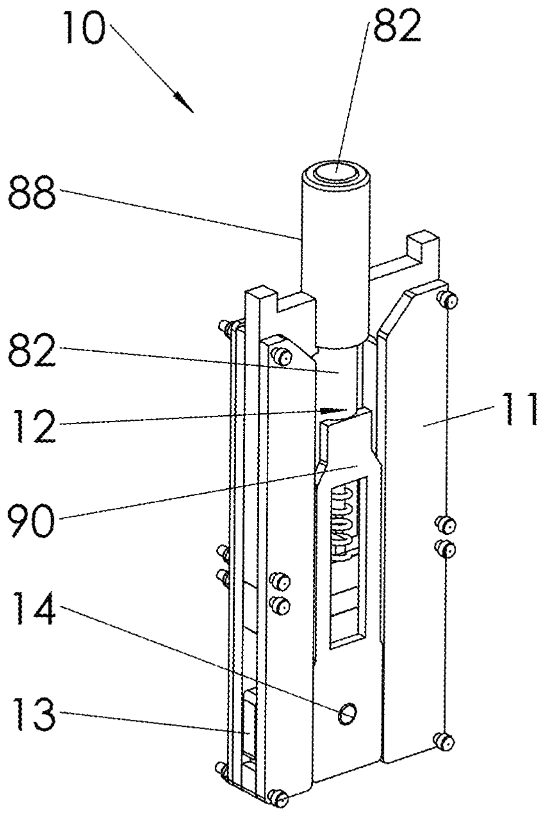
FIG. 20 is a perspective view of a swivel lock assembly with the drive pin assembly in a lower or retracted position and the latch plate retracted.
Figure 21:
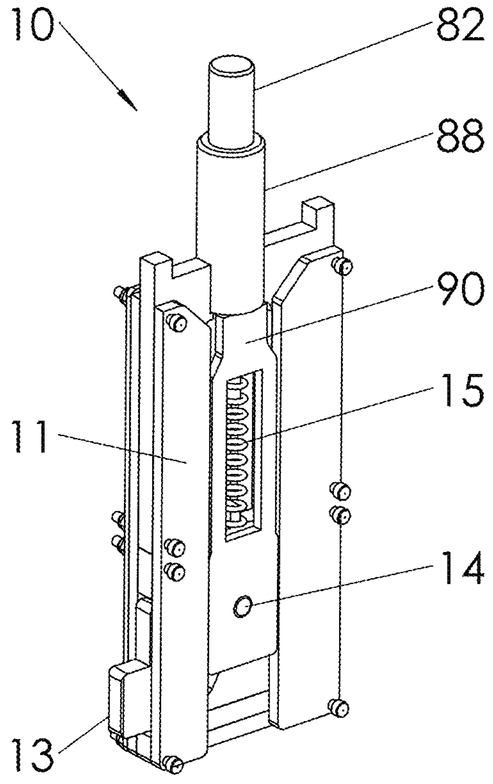
FIG. 21 is a perspective view of the swivel lock assembly with the drive pin assembly shown in FIG. 20 but now in an upper or extended position and the latch plate extended.

With reference to FIGS. 15, 19, 20 and 21, it can be seen that, in a specific embodiment, the swivel lock mechanism 10 may include a swivel lock housing 11 secured to the swivel base 9. The swivel lock housing 11 may include a drive pin assembly 12 that includes a drive pin 82 and drive pin plates 90 and 92 which are disposed for longitudinal movement within a sleeve 88 in a generally vertical or up and down direction. The drive pin 82 is disposed for longitudinal movement within a sleeve 88 that may be part of the swivel lock housing 11. The swivel lock mechanism 10 may include a spring 15 adapted to bias the drive pin assembly 12 in an upward direction. The drive pin assembly 12 is extended by the spring 15 so that the normal position of the drive pin assembly 12 is extended, and thus the normal position of a latch plate 13 is also extended (i.e., engaged to the spline 5), as more fully discussed below. The swivel lock housing 11 may further include the latch plate 13, which may include a slot 86 that may have a sloped length. The latch plate 13 is retained within the swivel lock housing 11 and adapted for lateral movement between a disengaged position as shown in FIGS. 15 and 20, and an engaged position as shown in FIGS. 17 and 21, as will be further discussed below. The latch plate 13 may be disposed for lateral movement between the plates 90 and 92, as can be seen in FIG. 19. The swivel lock housing 11 may further include a clevis pin 14 disposed through the slot 86 in the latch plate 13, and also adapted to move up and down within the slot 86 in unison with the drive pin assembly 12. In a specific embodiment, the drive pin 82 may be connected between a first drive pin plate 90 and a second drive pin plate 92. In a specific embodiment, the clevis pin 14 may be connected to the first and second drive pin plates 90 and 92. In this manner, the clevis pin 14 will move up and down with the drive pin assembly 12. When the drive pin 82 is in its depressed or lower position, by virtue of being pushed down and held in its depressed/lower position by the seat frame 16 (i.e., the seat 19 is in its sitting position), the clevis pin 14 is pushed to the bottom of the slot 86 in the latch plate 13, which forces the latch plate 13 laterally away from the central support column 3 and splines 5, as shown in FIGS. 15 and 20. When in this position, the seat 19 is allowed to swivel relative to the chair base 1.

However, as shown for example in FIGS. 17 and 21, when the seat frame 16 is moved upwardly away from the top of the drive pin 82, the spring 15 will push the drive pin assembly 12 upwardly into an upper or extended position. In a specific embodiment, the upper or extended position of the drive pin assembly 12 is reached when upper ends of the plates 90 and 92 make contact with a lower end of the sleeve 88. This will also function to move the clevis pin 14 upwardly along an inclined slope of the slot 86, which will cause the latch plate 13 to move laterally toward the central column 3 and into engagement with one of a plurality of grooves 6 in the spline 5, as best shown in FIG. 19. When in this position, the swivel base 9 is now engaged with or locked to the chair base 1, thereby preventing rotation of the swivel base 9 (and seat 19) relative to the chair base 1.

It can now be seen that when the latch plate 13 is extended or laterally moved toward the central support column 3, the latch plate 13 is engaged with one of the grooves 6 in the spline 5 and thereby prevents rotation of the swivel base 9. When the latch plate 13 is retracted or laterally moved away from the central support column 3 the latch plate 13 will become disengaged from the spline 5 and thereby permit the swivel base 9 to freely rotate relative to the chair base 1. It can further be seen that the latch plate 13 will be in its extended position (i.e., engaged with the spline 5) when the drive pin 82 is in its extended or upper position (see FIGS. 17 and 21), and the latch plate 13 will be in its retracted (i.e., disengaged from the spline 5) when the drive pin 82 is in its retracted or lower position (see FIGS. 15 and 20).

It can further be seen that the sloped length of the slot 86 functions in combination with the clevis pin 14 to cause the latch plate 13 to be extended when the drive pin 82 is extended, and to cause the latch plate 13 to be retracted when the drive pin 82 is retracted. The slot 86 may also have a vertical length 87 that locks the latch plate 13 in its extended position so that it cannot be forced back into the housing 11 when the drive pin assembly 12 is fully extended.

When the "Assist Height" of the seat 19 is fully down, the seat frame 16 depresses the drive pin 82 to its retracted or extended position, thus retracting the latch plate 13 and disengaging the latch plate 13 from the spline 5 and allowing relative rotation between the chair base 1 and the swivel base 9. As the "Assist Height" extends marginally, the seat frame 16 moves away from the swivel base 9 and the drive pin 82, which will result in the drive pin 82 moving up and the latch plate 13 engaging the spline 5, thereby locking the swivel base 9 relative to the chair base 1 and preventing the swivel base 9 and seat 19 from rotating relative to the chair base 1.

As best shown in FIG. 19, in a specific embodiment, the spline 5 on the central column 3 of the chair base 1 may include multiple grooves 6 that allow the latch plate 13 to engage in a multitude of directions when the latch plate 13 aligns with any particular groove. Also, in a specific embodiment, in a given condition when the Assist Height is extended and the latch plate 13 is not aligned with a groove 6 on the spline 5, then the spring 15 pressure pushes the latch plate 13 against a ridge of the spline 5 until the swivel base 9 rotates a small amount and the latch plate 13 aligns with the next groove 6, and extends into the groove 6, thus locking further rotation. This allows for only minor rotation of the swivel base 9 in either direction before automatically becoming locked and preventing any further rotation.

The lift assist chair 100 is designed ergonomically so that the user can adjust the sitting height, while sitting, to suit their physical stature and for their comfort. The user will generally enter the chair 100 while the assist height is in the extended (raised) position. While standing, the user will reverse onto the seat cushion 19 and hold onto the arm rests 17 which act as conveniently located handles. The user/helper will activate the control switch 24 located on the arm rest 17 to retract the assist height of the seat frame 16 as they lower down from the standing to seated positions. As noted above, if the user is acting alone, a feature of the lift assist chair 100 may be that the control switch 24 is located adjacent the portion of the arm rest frame 17 that the user is holding so that the user can operate the control switch 24 without letting go of the arm rest frame 17. The user will shower while the assist height is in the retracted (lowered) position and will be able to swivel so that the shower water comes from the desired direction.

Another feature of the lift assist chair 100, in a specific embodiment, may be that the lift assist chair is of a compact design and provided with a minimal turn radius to allow the lift assist chair 100 to fit and function within small shower spaces. For example, as shown in FIG. 5, in a specific embodiment, the lift assist chair 100 may be designed to fit within a circular "footprint" having a diameter less than 36 inches. In a specific embodiment, the circular footprint may be a circle 8 as indicated by dashed lines having a center that is co-axial with the central support column 3. In a specific embodiment, all of the parts of the lift assist chair 100 may be contained within the circle 8.

Once showering is completed, in a specific embodiment, the user will swivel towards the exit of the shower. The user may fasten safety straps 27 and 28 around the user's waist and hold onto the arm rest handles 17. The user/helper may activate the control switch 24 located on the arm rest 17 to extend (raise) the assist height of the seat frame 16 as the user travels upward in an arc motion from a seated position to a standing position. In a specific embodiment, the control of the raise and lower functions may be achieved using a remote control box 66 as shown in FIG. 11. The user may continue holding the arm rest handles 17 and progressively support their weight on their legs until they are sufficiently raised to stand on their own.

When the battery 26 needs charging the user/helper will remove the rechargeable battery 26 to be recharged at a suitable remote charging location which is dry and has a power outlet. The chair 100 may include cushion seat pads 19 that can be removed for cleaning and can be replaced to ensure long term hygiene. The chair 100 in its preferred configuration is battery powered, thus removing the need for electrical connections to main power inside the shower. In other configurations also encompassed by the present inventions, the chair 100 may be powered by water, hydraulic, air, gas systems, or main power.

Figure 12:
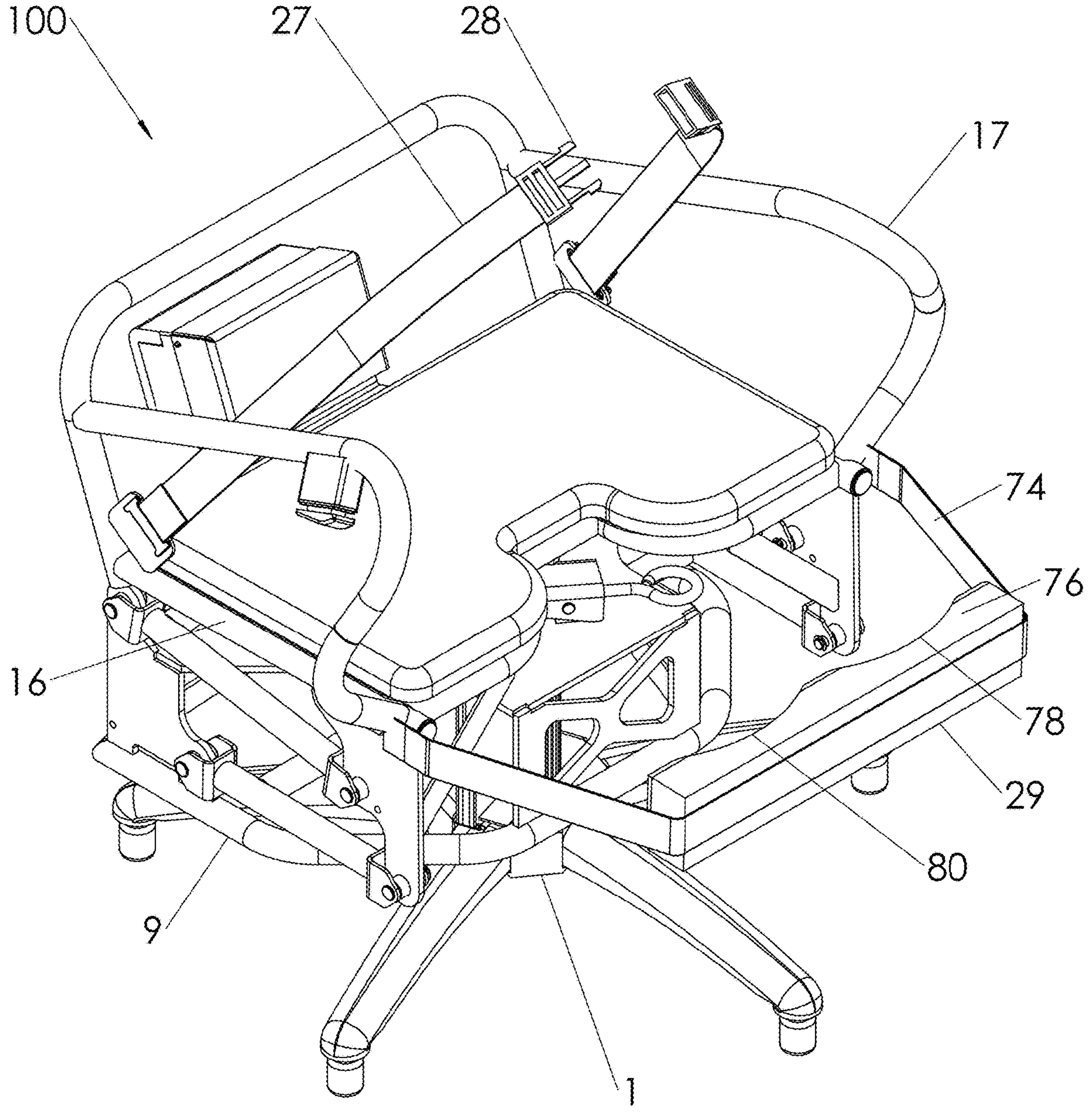
FIG. 12 is a perspective view of another specific embodiment of a shower chair including a specific embodiment of a knee stop.

An optional accessory that can be added to the chair 100 is a knee stop. This accessory may be necessary for users who are particularly weak and cannot reliably support their own weight as the lift assist moves them to a near standing position. In one specific embodiment, the knee stop 29 may be installed on the seat frame 16 (see FIGS. 1, 2 and 12) and function as a secure support to locate the user's knees, as the seat 16 is being extended, so that the user cannot slip down the slope of the seat and have an accident. With reference to FIG. 12, in a specific embodiment, the knee stop 29 may include a strap 74 that may be secured at one end to a left side of the arm rest 17 and removably attached to a right side of the arm rest 17, such as with a loop on the end of the strap 74 and a hook attached to the right side of the arm rest 17, or with mating connectors such as discussed with the safety straps 27 and 28 discussed elsewhere herein. In this specific embodiment, the knee stop 29 may also include a foam pad 76 that may be attached to the strap 74, such as by an adhesive. The foam pad 76 may include a left concave surface 78 and a right concave surface 80 facing toward the seat 19. In use, the removable end of the strap 74 may be disconnected from the arm rest 17 and laid on the ground to the side. The user may then sit on the seat 19, then position the left and right concave surfaces 78 and 80 adjacent the upper shin areas of the users legs, and then pulled the free end of the strap 74 is then secured to the arm rest 17. In this manner, the knee stop 29 may be used to provide stability for the user as the seat 19 moves up and down between its first and second positions.

In another specific embodiment, the knee stop 70-72 may be installed on the swivel base 9 (see FIGS. 3, 4 & 7) with adjustable frames 71, and folding stop bars 72. As best shown in FIG. 7, in this specific embodiment, there may be a left and a right knee stop assembly, each including a mounting tube 70 secured to the swivel base 9, a generally L-shaped adjustable frame 71, and a flip up stop bar 72 (which may be padded) hingedly or rotatably attached to an upper end of a shorter leg of the L-shaped adjustable frame 71. The stop bars 72 may be adapted for movement between a first or lowered position as shown in FIG. 7 and a second or raised position (not shown) in which the stop bar 72 would be rotated upwardly into a generally vertical position and at a generally right angle to the first/lowered position. The longer leg of the L-shaped adjustable frame may be provided with the ability to telescope within (i.e., slide in or out of) the mounting tube 70 and adapted for snapping into and out of various adjustable positions, so as to allow the user to position the stop bars 72 at an appropriate, comfortable leg distance in front of the seat 16, depending on the size of the user. For example, the mounting tube 70 may include a plurality or series of adjustment holes or apertures adapted for engagement with a spring-loaded detent mechanism on the L-shaped frame 71. In another specific embodiment, the chair 100 may include a waist belt including safety straps 27 and 28 that can be fastened around the user's waist to secure the user to the seat frame 16 and prevent the user from accidentally slipping out of the seat when it is in use, such as when the seat frame 16 is being raised and lowered.

It can be seen from the above descriptions that the inventions include a chair that has many possible features that can enable the user to shower in dignity and safety thus extending their independence and limiting the need for assistance and minimizing injuries.

It is to be understood that the inventions disclosed herein are not limited to the exact details of construction, operation, exact materials or embodiments shown and described. Although specific embodiments of the inventions have been described, various modifications, alterations, alternative constructions, and equivalents are also encompassed within the scope of the inventions. Although the present inventions may have been described using a particular series of steps, it should be apparent to those skilled in the art that the scope of the present inventions is not limited to the described series of steps. The specification and drawings are, accordingly, to be regarded in an illustrative rather than a restrictive sense. It will be evident that additions, subtractions, deletions, and other modifications and changes may be made thereunto without departing from the broader spirit and scope of the inventions as set forth in the claims set forth below. Accordingly, the inventions are therefore to be limited only by the scope of the appended claims. None of the claim language should be interpreted pursuant to 35 U.S.C. 112(f) unless the word "means" is recited in any of the claim language, and then only with respect to any recited "means" limitation.

The invention claimed is:

1. A chair comprising:

a corrosion-resistant chair base including a plurality of corrosion-resistant legs and a corrosion-resistant central support column;

a corrosion-resistant swivel base rotatably connected to and supported by the central support column on the chair base, and configured for rotatable movement relative to the central support column on the chair base, wherein the swivel base includes a height adjustment lever configured to actuate a gas spring attached to the central support column and configured to raise and lower the swivel base in relation to the chair base;

a corrosion-resistant seat frame having a left side, a right side, and an upper surface, the seat frame being connected to the swivel base;

a corrosion-resistant seat attached to the upper surface of the seat frame;

a corrosion-resistant left arm rest attached to the left side of the seat frame;

a corrosion-resistant right arm rest attached to the right side of the seat frame;

a corrosion-resistant linear actuator supported by the swivel base and connected to the seat frame to move the seat frame between a sitting position and a raised position; and a waterproof control switch adapted to control the linear actuator.

2. The chair of claim 1, further including a removable waterproof rechargeable battery, and wherein the linear actuator is one of an electric linear actuator, a hydraulic linear actuator, and a pneumatic linear actuator, and the removable waterproof rechargeable battery is in waterproof electrical communication with the linear actuator.

3. The chair of claim 1, wherein the central support column extends upwardly away from a central portion of the chair base, and includes a swivel lock spline.

4. The chair of claim 1, wherein the swivel base includes a height adjustment lever adapted to actuate a gas spring attached to the central support column to raise and lower the swivel base in relation to the chair base.

5. The chair of claim 1, wherein the swivel base automatically locks to the chair base when the seat frame is raised away from its sitting position to its raised position, and the swivel base automatically unlocks from the chair base when the seat frame is returned to its sitting position.

6. The chair of claim 1, wherein the waterproof control switch is mounted to one of the left arm rest or the right arm rest adjacent a grasping location by a user so that a user can grasp the arm rest to which the waterproof control switch is mounted and operate the waterproof control switch without releasing the user's grasp of said arm rest.

7. The chair of claim 1, wherein each of the chair base, the central support column, the swivel base and the seat frame is constructed from one of aluminum, stainless steel, a powder-coated ferrous metal, carbon fiber, plastic, fiberglass, and polymers.

8. The chair of claim 1, wherein the seat frame includes a recessed opening at a front central location of the seat frame, and the seat includes a corresponding recessed opening.

9. The chair of claim 1, wherein the left arm rest includes a left outwardly curved arcuate support member connected to and extending upwardly and outwardly away from the left side of the seat frame, and the right arm rest includes a right outwardly curved arcuate support member connected to and extending upwardly and outwardly away from the right side of the seat frame.

10. The chair of claim 1, further including a back support supported by the seat frame and adjacent a rear portion of the seat frame.

11. The chair of claim 1, further including:

an upper leg assembly including a left arm, a right arm, and transverse support member disposed between and connected to the left arm and the right arm, a first end of the left arm being connected to a first front left side of the seat frame, a first end of the right arm being connected to a first front right side of the seat frame, a second end of the left arm being connected to a first rear left side of the swivel base, and a second end of the right arm being connected to a first rear right side of the swivel base; and a lower leg assembly including a left arm, a right arm, and transverse support member disposed between and connected to the left arm and the right arm, a first end of the left arm being connected to a second front left side of the seat frame, a first end of the right arm being connected to a second front right side of the seat frame, a second end of the left arm being connected to a second rear left side of the swivel base, and a second end of the right arm being connected to a second rear right side of the base.

12. The chair of claim 1, each of the plurality of legs on the chair base includes one of a self-leveling foot member or locking casters.

13. The chair of claim 1, further including a knee stop connected to one of the seat frame or the swivel base.

14. The chair of claim 1, further including:

a left knee stop assembly including a mounting tube attached to a left side of the swivel base, an adjustable frame having a first end adapted for releasable and telescoping movement within the mounting tube, and a flip up stop bar rotatably attached to a second end of the adjustable frame and movable between a first position and a second position; and a right knee stop assembly including a mounting tube attached to a right side of the swivel base, an adjustable frame having a first end adapted for releasable and telescoping movement within the mounting tube, and a flip up stop bar rotatably attached to a second end of the adjustable frame and movable between a first position and a second position.

15. The chair of claim 1, further including a seat cushion attached to an upper surface of the seat, wherein an upper surface of the seat cushion includes a non-slip texture.

16. The chair of claim 1, further including a waist belt comprising a first safety strap and a second safety strap, the first safety strap being attached to the left side of the seat frame and the second safety strap being attached to the right side of the seat frame, the first and second safety straps being releaseably engageable to each other.

17. The chair of claim 1, wherein the entirety of the chair is contained within a circle having a center coaxial with a center of the central support column and having a diameter less than 36 inches.

18. A chair comprising:

a corrosion-resistant chair base including a plurality of corrosion-resistant legs and a corrosion-resistant central support column;

a corrosion-resistant swivel base rotatably connected to and supported by the central support column on the chair base, and configured for rotatable movement relative to the central support column on the chair base, wherein the swivel base includes a height adjustment lever configured to actuate a gas spring attached to the central support column and configured to raise and lower the swivel base in relation to the chair base;

a corrosion-resistant seat frame having a left side, a right side, and an upper surface, the seat frame being connected to the swivel base;

a corrosion-resistant seat attached to the upper surface of the seat frame;

a corrosion-resistant left arm rest attached to the left side of the seat frame;

a corrosion-resistant right arm rest attached to the right side of the seat frame;

a corrosion-resistant linear actuator supported by the swivel base and connected to the seat frame to move the seat frame between a sitting position and a raised position;

a waterproof control switch adapted to control the linear actuator; and a removable waterproof rechargeable battery in waterproof electrical communication with the linear actuator.

19. The chair of claim 18, wherein the central support column extends up wardly away from a central portion of the chair base, and includes a swivel lock spline.

20. The chair of claim 18, wherein the swivel base includes a height adjustment lever adapted to actuate a gas spring attached to the central support column to raise and lower the swivel base in relation to the chair base.

21. The chair of claim 18, wherein the swivel base automatically locks to the chair base when the seat frame is raised away from its sitting position to its raised position, and the swivel base automatically unlocks from the chair base when the seat frame is returned to its sitting position.

22. The chair of claim 18, wherein the waterproof control switch is mounted to one of the left arm rest or the right arm rest adjacent a grasping location by a user so that a user can grasp the arm rest to which the waterproof control switch is mounted and operate the waterproof control switch without releasing the user's grasp of said arm rest.

23. The chair of claim 18, wherein each of the chair base, the central support column, the swivel base and the seat frame is constructed from one of aluminum, stainless steel, a powder-coated ferrous metal, carbon fiber, plastic, fiberglass, and polymers.

24. The chair of claim 18, wherein the seat frame includes a recessed opening at a front central location of the seat frame, and the seat includes a corresponding recessed opening.

25. The chair of claim 18, wherein the left arm rest includes a left outwardly curved arcuate support member connected to and extending upwardly and outwardly away from the left side of the seat frame, and the right arm rest includes a right outwardly curved arcuate support member connected to and extending upwardly and outwardly away from the right side of the seat frame.

26. The chair of claim 18, further including a back support supported by the seat frame and adjacent a rear portion of the seat frame.

27. The chair of claim 18, further including:

an upper leg assembly including a left arm, a right arm, and transverse support member disposed between and connected to the left arm and the right arm, a first end of the left arm being connected to a first front left side of the seat frame, a first end of the right arm being connected to a first front right side of the seat frame, a second end of the left arm being connected to a first rear left side of the swivel base, and a second end of the right arm being connected to a first rear right side of the swivel base; and a lower leg assembly including a left arm, a right arm, and transverse support member disposed between and connected to the left arm and the right arm, a first end of the left arm being connected to a second front left side of the seat frame, a first end of the right arm being connected to a second front right side of the seat frame, a second end of the left arm being connected to a second rear left side of the swivel base, and a second end of the right arm being connected to a second rear right side of the base.

28. The chair of claim 18, each of the plurality of legs on the chair base includes one of a self-leveling foot member or locking casters.

29. The chair of claim 18, further including a knee stop connected to one of the seat frame or the swivel base.

30. The chair of claim 18, further including:

a left knee stop assembly including a mounting tube attached to a left side of the swivel base, an adjustable frame having a first end adapted for releasable and telescoping movement within the mounting tube, and a flip up stop bar rotatably attached to a second end of the adjustable frame and movable between a first position and a second position; and a right knee stop assembly including a mounting tube attached to a right side of the swivel base, an adjustable frame having a first end adapted for releasable and telescoping movement within the mounting tube, and a flip up stop bar rotatably attached to a second end of the adjustable frame and movable between a first position and a second position.

31. The chair of claim 18, further including a seat cushion attached to an upper surface of the seat, wherein an upper surface of the seat cushion includes a non-slip texture.

32. The chair of claim 18, further including a waist belt comprising a first safety strap and a second safety strap, the first safety strap being attached to the left side of the seat frame and the second safety strap being attached to the right side of the seat frame, the first and second safety straps being releaseably engageable to each other.

33. The chair of claim 18, wherein the entirety of the chair is contained within a circle having a center coaxial with a center of the central support column and having a diameter less than 36 inches.

34. A chair comprising:

a corrosion-resistant chair base including a plurality of corrosion-resistant legs and a corrosion-resistant central support column;

a spline secured around the central support column and including a plurality of longitudinal grooves disposed in an outer surface of the spline;

a corrosion-resistant swivel base rotatably connected to and supported by the central support column on the chair base, and configured for rotatable movement relative to the central support column on the chair base, wherein the swivel base includes a height adjustment lever configured to actuate a gas spring attached to the central support column and configured to raise and lower the swivel base in relation to the chair base;

a corrosion-resistant seat frame having a left side, a right side, and an upper surface, the seat frame being connected to the swivel base;

a corrosion-resistant seat attached to the upper surface of the seat frame;

a corrosion-resistant left arm rest attached to the left side of the seat frame;

a corrosion-resistant right arm rest attached to the right side of the seat frame;

a corrosion-resistant linear actuator supported by the swivel base and connected to the seat frame to move the seat frame between a sitting position and a raised position;

a waterproof control switch adapted to control the linear actuator;

a removable waterproof rechargeable battery in waterproof electrical communication with the linear actuator; and a drive pin connected to the swivel base and disposed for movement between an extended position and a retracted position, and a latch plate disposed for movement between an extended position and a retracted position, the latch plate engaging one of the plurality of longitudinal grooves in the spline when the drive pin is in its extended position, and the latch plate being disengaged from the spline when the drive pin is in its retracted position.

35. The chair of claim 34, wherein the central support column extends upwardly away from a central portion of the chair base, and includes a swivel lock spline.

36. The chair of claim 34, wherein the swivel base includes a height adjustment lever adapted to actuate a gas spring attached to the central support column to raise and lower the swivel base in relation to the chair base.

37. The chair of claim 34, wherein the waterproof control switch is mounted to one of the left arm rest or the right arm rest adjacent a grasping location by a user so that a user can grasp the arm rest to which the waterproof control switch is mounted and operate the waterproof control switch without releasing the user's grasp of said arm rest.

38. The chair of claim 34, wherein each of the chair base, the central support column, the swivel base and the seat frame is constructed from one of aluminum, stainless steel, a powder-coated ferrous metal, carbon fiber, plastic, fiberglass, and polymers.

39. The chair of claim 34, wherein the seat frame includes a recessed opening at a front central location of the seat frame, and the seat includes a corresponding recessed opening.

40. The chair of claim 34, wherein the left arm rest includes a left outwardly curved arcuate support member connected to and extending upwardly and outwardly away from the left side of the seat frame, and the right arm rest includes a right outwardly curved arcuate support member connected to and extending upwardly and outwardly away from the right side of the seat frame.

41. The chair of claim 34, further including a back support supported by the seat frame and adjacent a rear portion of the seat frame.

42. The chair of claim 34, further including:

an upper leg assembly including a left arm, a right arm, and transverse support member disposed between and connected to the left arm and the right arm, a first end of the left arm being connected to a first front left side of the seat frame, a first end of the right arm being connected to a first front right side of the seat frame, a second end of the left arm being connected to a first rear left side of the swivel base, and a second end of the right arm being connected to a first rear right side of the swivel base; and a lower leg assembly including a left arm, a right arm, and transverse support member disposed between and connected to the left arm and the right arm, a first end of the left arm being connected to a second front left side of the seat frame, a first end of the right arm being connected to a second front right side of the seat frame, a second end of the left arm being connected to a second rear left side of the swivel base, and a second end of the right arm being connected to a second rear right side of the base.

43. The chair of claim 34, each of the plurality of legs on the chair base includes one of a self-leveling foot member or locking casters.

44. The chair of claim 34, further including a knee stop connected to one of the seat frame or the swivel base.

45. The chair of claim 34, further including:

a left knee stop assembly including a mounting tube attached to a left side of the swivel base, an adjustable frame having a first end adapted for releasable and telescoping movement within the mounting tube, and a flip up stop bar rotatably attached to a second end of the adjustable frame and movable between a first position and a second position; and a right knee stop assembly including a mounting tube attached to a right side of the swivel base, an adjustable frame having a first end adapted for releasable and telescoping movement within the mounting tube, and a flip up stop bar rotatably attached to a second end of the adjustable frame and movable between a first position and a second position.

46. The chair of claim 34, further including a seat cushion attached to an upper surface of the seat, wherein an upper surface of the seat cushion includes a non-slip texture.

47. The chair of claim 34, further including a waist belt comprising a first safety strap and a second safety strap, the first safety strap being attached to the left side of the seat frame and the second safety strap being attached to the right side of the seat frame, the first and second safety straps being releaseably engageable to each other.

48. The chair of claim 34, wherein the entirety of the chair is contained within a circle having a center coaxial with a center of the central support column and having a diameter less than 36 inches.

* * * * *